US011127163B2

(12) United States Patent
Hesse et al.

(10) Patent No.: US 11,127,163 B2
(45) Date of Patent: Sep. 21, 2021

(54) SKINNED MULTI-INFANT LINEAR BODY MODEL

(71) Applicants: FRAUNHOFER-GESELLSCHAFT ZUR FÖRDERUNG DER ANGEWANDTEN FORSCHUNG E.V., Munich (DE); MAX-PLANCK-GESELLSCHAFT ZUR FORDERUNG DER WISSENSCHAFTEN, Munich (DE)

(72) Inventors: Nikolas Hesse, Karlsruhe (DE); Sergi Pujades, Grenoble (FR); Javier Romero, Barcelona (ES); Michael Black, Tübingen (DE)

(73) Assignees: FRAUNHOFER-GESELLSCHAFT ZUR FÖRDERUNG DER ANGEWANDTEN FORSCHUNG E.V., Munich (DE); MAX-PLANCK-GESELLSCHAFT ZUR FORDERUNG DER WISSENSCHAFTEN, Munich (DE)

(*) Notice: Subject to any disclaimer, the term of this patent is extended or adjusted under 35 U.S.C. 154(b) by 0 days.

(21) Appl. No.: 16/550,266

(22) Filed: Aug. 25, 2019

(65) Prior Publication Data
US 2020/0058137 A1    Feb. 20, 2020

Related U.S. Application Data

(63) Continuation-in-part of application No. 15/739,658, filed as application No. PCT/EP2016/064610 on Jun. 23, 2016, now Pat. No. 10,395,411.
(Continued)

(51) Int. Cl.
G06T 7/77    (2017.01)
G06T 7/73    (2017.01)
(Continued)

(52) U.S. Cl.
CPC ............ G06T 7/77 (2017.01); G06K 9/00342 (2013.01); G06T 7/55 (2017.01); G06T 7/75 (2017.01);
(Continued)

(58) Field of Classification Search
None
See application file for complete search history.

(56) References Cited

U.S. PATENT DOCUMENTS 5,883,638 A    3/1999  Rouet et al.
8,797,328 B2   8/2014  Corazza et al.
(Continued)

OTHER PUBLICATIONS

Allen, B., et. al., Articulated Body Deformation From Range Scan Data, Proceedings of the 29th Annual Conference on Computer Graphics and interactive Techniques, SIGGRAPH, 2002, pp. 612-619.
(Continued)

*Primary Examiner* — Frank S Chen
(74) *Attorney, Agent, or Firm* — Siritzky Law, PLLC

(57) ABSTRACT

A computer-implemented method for automatically obtaining pose and shape parameters of a human body. The method includes obtaining a sequence of digital 3D images of the body, recorded by at least one depth camera; automatically obtaining pose and shape parameters of the body, based on images of the sequence and a statistical body model; and outputting the pose and shape parameters. The body may be an infant body.

24 Claims, 30 Drawing Sheets
(28 of 30 Drawing Sheet(s) Filed in Color)

Related U.S. Application Data

(60) Provisional application No. 62/183,853, filed on Jun. 24, 2015.

(51) Int. Cl.
    *G06T 7/55*     (2017.01)
    *G06T 13/40*     (2011.01)
    *G06T 17/20*     (2006.01)
    *G06K 9/00*     (2006.01)

(52) U.S. Cl.
CPC ............ *G06T 13/40* (2013.01); *G06T 17/205* (2013.01); *G06T 2207/10028* (2013.01); *G06T 2207/30196* (2013.01)

(56) References Cited

U.S. PATENT DOCUMENTS

| | | | |
|---|---|---|---|
| 2013/0249908 A1* | 9/2013 | Black | G06K 9/00369 345/420 |
| 2014/0375635 A1 | 12/2014 | Johnson et al. | |
| 2016/0371542 A1* | 12/2016 | Sugita | G06F 3/00 |

OTHER PUBLICATIONS

Allen, B., et. al., Learning a Correlated Model of Identity and Pose-dependent Body Shape Variation for Real-Time Synthesis, ACM SIGGRAPH/Eurographics Symposium on Computer Animation, 2006, pp. 147-156.
Allen, B., et. al., The Space of Human Body Shapes: Reconstruction and Parameterization from Range Scans, ACM SIGGRAPH, 2003, pp. 587-594.
Anguelov, D., et. al., SCAPE: Shape Completion and Animation of People, ACM SIGGRAPH, 2005, pp. 408-416.
Baran, I., et. al., Automatic Rigging and Animation of 3D Characters, ACM SIGGRAPH 26,3, 2007, Article No. 72.
Bogo, F., et, al., FAUST: Dataset and Evaluation for 3D Mesh Registration, IEEE Conference on Computer Vision and Pattern Recognition (CVPR), 2014, pp. 3794-3801.
Chang, W., et. al., Range Scan Registration Using Reduced Deformable Models, Computer Graphics Forum 28,2, 2009, pp. 447-456.
Chen, Y., et. al., Tensor-based Human Body Modeling, IEEE Conference on Computer Vision and Pattern Recognition (CVPR), 2013 pp. 105-112. CMU Graphics Lab Motion Capture Database, http://mocap.cs.cmu.edu. Accessed: Dec. 11, 2012.
De Aguiar, S., et al., Automatic Conversion of Mesh Animations into Skeleton-based Animations, Computer Graphics Forum 27,2, 2008 pp. 389-397.
Dyna dataset, http://dyna.is.tue.mpg.de/. Accessed: Jun. 14, 2018.
Freifeld, O., et. al., Lie Bodies: A Manifold Representation of 3D Human Shape, European Conference on Computer Vision (ECCV), Springer-Verlag, A. Fitzgibbon et. al. (Eds.), Ed., Part I, 2012, LNCS 7572, pp. 1-14.
Hasler, N., et. al., A Statistical Model of Human Pose and Body Shape, Computer Graphics Forum 28,2, 2009, pp. 337-346.
Hasler, N., et. al., Learning Skeletons for Shape and Pose, Proceedings of the 2010 ACM SIGGRAPH Symposium on Interactive 3D Graphics and Games, pp. 23-30.
Hirshberg, D., et. al., Coregistration: Simultaneous Alignment and Modeling of Articulated 3D Shape, European Conference on Computer Vision (ECCV), Springer-Verlag, A.F. et. al. (Eds.), Ed., LNCS 7577, Part IV, 2012, pp. 242-255.
James, D.L., et. al., Skinning Mesh Animation, ACM Transaction of Graphics, 24, 3, 2005, pp. 399-407.
Kavan, L., et. al., Automatic Linearization of Nonlinear Skinning, Proceedings of the 2009 Symposium on Interactive 3D Graphics and Games, ACM, pp. 49-56.
Kavan, L., el. al., Geometric Skinning with Approximate Dual Quaternion Blending, ACM Transactions on Graphics (TOG) 27, 4, 2008, Article No. 105.
Kavan, L., et. al., Spherical Blend Skinning: A Real-time Deformation of Articulated Models, Proceedings of the 2005 Symposium on Interactive 3D Graphics and Games, ACM, pp. 9-16.
Kry, P.G., et. al., EigenSkin: Real Time Large Deformation Character Skinning in Hardware, Proceedings of the 2002 ACM SIGGRAPH/Eurographics Symposium on Computer Animation, pp. 153-159.
Kurihara, T., et. al., Modeling Deformable Human Hands From Medical Images, Proceedings of the 2004 ACM SIGGRAPH/Eurographics Symposium on Computer Animation, Eurographics Association, pp. 355-363.
Lawson, C., et. al., Solving Least Squares Problems, Classics in Applied Mathematics, SIAM: Society of Industrial and Applied Mathematics, 1995.
Le, B.H.., et. al., Robust and Accurate Skeletal Rigging from Mesh Sequences, ACM Transaction on Graphics 33,4, 2014 Article 84:1-84:10.
Le, B.H.., et. al., Smooth Skinning Decomposition with Rigid Bones, ACM Transaction on Graphics 31,6, 2012, Article 199:1-199:10.
Lewis, J.P. et. al., Pose Space Deformation: A Unified Approach to Shape Interpolation and Skeleton-Driven Deformation, Proceeding of the 27th Annual Conference on Computer Graphics and Interactive Techniques, ACM Press/Addison-Wesly Publishing Co., New York, NY, 2000, pp. 165-172.
Loper, M.M., et. al., MoSh: Motion and Shape Capture from Sparse Markers, ACM Transaction on Graphics 33, 6, 2014 Article 220:1-220:13.
Loper, M.M., et. al., OpenDR: An Approximate Differentiable Renderer, Computer Vision—ECCV, Springer International Publishing , vol. 8695, 2014 pp. 154-169.
Merry, B., et. al., Animation Space: A Truly Linear Framework for Character Animation, ACM Transaction on Graphics 25, 4, 2006 pp. 1400-1423.
Miller, C., et. al., Frankenrigs: Building Character Rigs from Multiple Sources, Proceedings 2010 ACM SIGGRAPH Symposium on Interactive 3D Graphics and Games, New York, NY, 2010 pp. 31-38.
Mohr, A., et. al., Building Efficient, Accurate Character Skins from Examples, ACM Transaction on Graphics, 2003, pp. 562-568.
Nocedal, J., et. al., Numerical Optimization, 2nd ed. Springer, New York, 2006.
Pons-Moll, G., et. al., Dyna: A Model of Dynamic Human Shape in Motion, ACM Transaction on Graphics, 2015, Article 120:1-120:14.
Rhee, T., et. al., Real-Time Weighted Posespace Deformation on the GPU, Eurographics 25,3, 2006.
Robinette, K., et. al., Civilian American and European Surface Anthropometry Resource (CAESAR) Final Report, AFRL-HE-WP-TR-2002-0169, US Air Force Research Laboratory, 2002.
Schaefer, S., et. al., Example-Based Skeleton Extraction, Proceedings of the Fifth Eurographics Symposium on Geometry Processing, Eurographics Association, Airela-Ville, Switzerland, 2007, pp. 153-162.
Seo, H., et. al., Synthesizing Animatable Body Models with Parameterized Shape Modifications, Proceedings of the 2003 ACM SIGGRAPH/Eurographics Symposium on Computer Animation, Eurographics Association, Aire-la-Ville, Switzerland, 2003, pp. 120-125.
Tsoli, A., et. al., Breathing Life into Shape: Capturing, Modeling and Animating 3D Human Breathing, 33, ACM Transaction of Graphics, 2014, 52:1-52:11.
Wang, R.Y., et. al., Real-Time Enveloping with Rotational Regression , ACM Transactions of Graphics, 26, 3, 2007.
Wang, X.C., et. al., Multi-weight enveloping: Least Squares Approximation Techniques for Skin Animation, Proceedings of the 2002 ACM SIGGRAPH/Eurographics Symposium of Computer Animation, ACM, New York, 2002, pp. 129-138.
Weber, O., et. al., Context-Aware Skeletal Shape Deformation, Computer Graphics Forum, 26, 3, 2007, pp. 265-274.
WIPO/EPO, International Preliminary Report on Patentability Chapter I, PCT/EP2016/064610, dated Dec. 26, 2017 (13p.)
WIPO/EPO, International Search Report, PCT/EP2016/064610, dated Dec. 29, 2016 (6p.)

(56) References Cited

OTHER PUBLICATIONS

WIPO/EPO, Written Opinion of the International Searching Authority, PCT/EP2016/064610, dated Dec. 29, 2016 (12p.)

* cited by examiner (a) $\bar{T}, \mathcal{W}$ (b) $\bar{T} + B_s(\vec{\beta}), J(\vec{\beta})$ (c) $T_P(\vec{\beta}, \vec{\theta}) = \bar{T} + B_s(\vec{\beta}) + B_P(\vec{\theta})$ (d) $W(T_P(\vec{\beta}, \vec{\theta}), J(\vec{\beta}), \vec{\theta}, \mathcal{W})$ (b) Initialization $W_i$ (a) Segmentation Motivation Preprocessing Learning

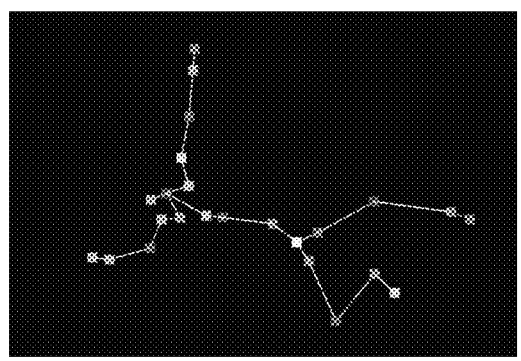
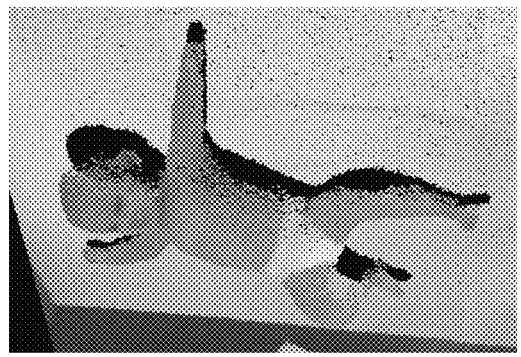
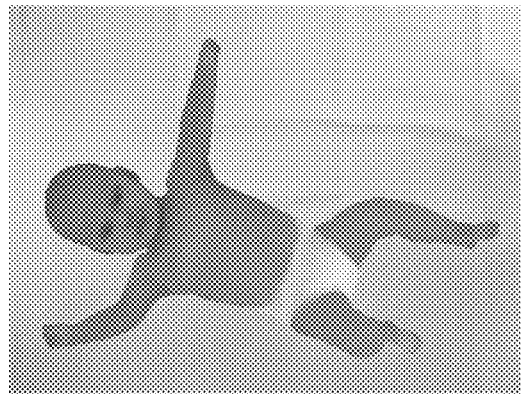
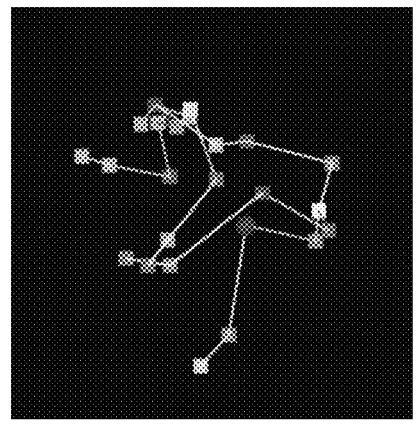
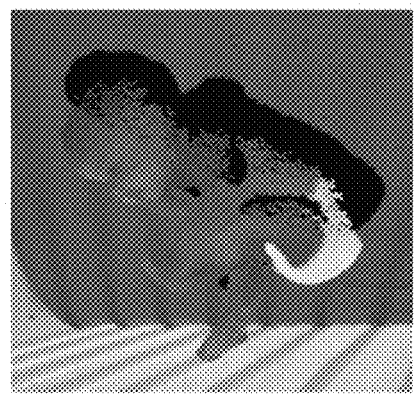
Fig. 28

SKINNED MULTI-INFANT LINEAR BODY MODEL

RELATED APPLICATIONS

This application is a continuation-in-part (CIP) of U.S. application Ser. No. 15/739,658, filed Jun. 23, 2016, which is a national stage entry of PCT/EP2016/064610, filed Jun. 23, 2016 and which claims the benefit of U.S. provisional application No. 62/183,853, filed Jun. 24, 2015, the entire contents of each of which are hereby fully incorporated herein by reference for all purposes.

FIELD

The present invention relates to realistic digital models of animated human bodies that can represent different body shapes, deform naturally with pose, and exhibit soft-tissue motions like those of real humans.

INTRODUCTION AND RELATED WORK

It is desirable that such models are fast to render, easy to deploy, and compatible with existing rendering engines.

Linear blend skinning and blend shapes are widely used throughout the animation industry. The commercial approach commonly involves hand rigging a mesh and manually sculpting blend shapes to correct problems with traditional skinning methods. Many blend shapes are typically needed and the manual effort required to build them is large.

As an alternative, the research community has focused on learning statistical body models from example scans of different bodies in a varied set of poses. While promising, these approaches are not compatible with existing graphics software and rendering engines that use standard skinning methods.

Many authors have tried to bring these worlds together with varying degrees of success.

Traditional methods model how vertices are related to an underlying skeleton structure. Basic linear blend skinning (LBS) models are the most widely used, are supported by all game engines, and are efficient to render. Unfortunately, they produce unrealistic deformations at joints including the well-known taffy and bowtie effects. Work has gone into skinning methods that ameliorate these effects [Lewis et al. 2000; Wang and Phillips 2002; Kavan and ára 2005; Merry et al. 2006; Kavan et al. 2008]. There has also been a lot of work on learning realistic body models from data [Allen et al. 2006; Anguelov et al. 2005; Freifeld and Black 2012; Hasler et al. 2010; Chang and Zwicker 2009; Chen et al. 2013]. These methods can capture the body shape of many people as well as non-rigid deformations due to pose. The most successful approaches are so far based on triangle deformations [Anguelov et al. 2005; Chen et al. 2013; Hasler et al. 2010; Pons-Moll et al. 2015]. Despite the above research, existing models either lack realism, do not work with existing packages, do not represent a wide variety of body shapes, are not compatible with standard graphics pipelines, or require significant manual labor.

Blend Skinning.

Skeleton subspace deformation methods also known as blend skinning, attach the surface of a mesh to an underlying skeletal structure. Each vertex in the mesh surface is transformed using a weighted influence of its neighboring bones. This influence can be defined linearly as in Linear Blend Skinning (LBS). The problems of LBS have been widely published and the literature is dense with generic methods that attempt to fix these, such as quaternion or dual-quaternion skinning, spherical skinning, etc. (e.g. [Wang and Phillips 2002; Kavan and ára 2005; Kavan et al. 2008; Le and Deng 2012; Wang et al. 2007]). Generic methods, however, often produce unnatural results.

Auto-Rigging.

There is a great deal of work on automatically rigging LBS models (e.g. [De Aguiar et al. 2008; Baran and Popovic 2007; Corazza and Gambaretto 2014; Schaefer and Yuksel 2007]) and commercial solutions exist. Most relevant here are methods that take a collection of meshes and infer the bones as well as the joints and blend weights (e.g. [Le and Deng 2014]). Such methods do not address the common problems of LBS models because they do not learn corrective blend shapes. Models created from sequences of meshes (e.g. [De Aguiar et al. 2008]) may not generalize well to new poses and motions The key limitation of the above methods is that the models do not span a space of body shapes. Miller et al. [2010] partially address this by auto-rigging using a database of pre-rigged models. They formulate rigging and skinning as the process of transferring and adapting skinning weights from known models to a new model. Their method does not generate blend shapes, produces standard LBS artifacts, and does not minimize a clear objective function.

Blend Shapes.

To address the shortcomings of basic blend skinning, the pose space deformation model (PSD) [Lewis et al. 2000] defines deformations (as vertex displacements) relative to a base shape, where these deformations are a function of articulated pose. This is largely followed by later approaches and is referred to as scattered data interpolation and corrective enveloping [Rouet and Lewis 1999]. Another approach is weighted pose-space deformation (WPSD) [Kurihara and Miyata 2004; Rhee et al. 2006], which defines the corrections in a rest pose and then applies a standard skinning equation (e.g. LBS). The idea is to define corrective shapes (sculpts) for specific key poses, so that when added to the base shape and transformed by blend skinning, produce the right shape. Typically, one finds the distance (in pose space) to the exemplar poses and uses a function, e.g. a Radial Basis (RBF) kernel [Lewis et al. 2000], to weight the exemplars non-linearly based on distance. The sculpted blend shapes are then weighted and linearly combined. In practice however, a large number of poses might be needed to cover the pose space well. This makes animation slow since the closest key poses have to be found at run time.

These approaches are all based on computing weighted distances to exemplar shapes. Consequently, these methods require computation of the distances and weights at runtime to obtain the corrective blend shape. For a given animation (e.g. in a video game) these weights are often defined in advance based on the poses and baked into the model. Game engines apply the baked-in weights to the blend shapes. The sculpting process is typically done by an artist and then only for poses that will be used in the animation.

Learning Pose Models.

Allen et al. [2002] use this PSD approach but rather than hand-sculpt the corrections, learn them from registered 3D scans. Their work focuses primarily on modeling the torso and arms of individuals, rather than whole bodies of a population. They store deformations of key poses and interpolate between them. When at, or close to, a stored shape, these methods are effectively perfect. They do not tend to generalize well to new poses, requiring dense training data. It is not clear how many such shapes would be necessary to model the full range of articulated human pose. As the complexity of the model increases, so does the complexity of controlling all these shapes and how they interact.

To address this, Kry et al. [2002] learn a low-dimensional PCA basis for each joint's deformations. Pose-dependent deformations are described in terms of the coefficients of the basis vectors. Kavan et al. [2009] use example meshes generated using a non-linear skinning method to construct linear approximations. James and Twigg [2005] combine the idea of learning the bones (non-rigid, affine bones) and skinning weights directly from registered meshes. For blend shapes, they use an approach similar to [Kry et al. 2002].

Another way to address the limitations of blend skinning is through multi-weight enveloping (MWE) [Wang and Phillips 2002]. Rather than weight each vertex by a weighted combination of the bone transformation matrices, MWE learns weights for the elements of these matrices. This increases the capacity of the model (more parameters). Like [James and Twigg 2005] they overparameterize the bone transformations to give more expressive power and then use PCA to remove unneeded degrees of freedom. Their experiments typically involve user interaction and current game engines do not support the MWE approach.

Merry et al. [2006] find MWE to be overparameterized, because it allows vertices to deform differently depending on rotation in the global coordinate system. Their Animation Space model reduces the parameterization at minimal loss of representational power, while also showing computational efficiency on par with LBS.

Mohr and Gleicher [2003] who learn an efficient linear and realistic model from example meshes propose another alternative. To deal with the problems of LBS, however, they introduce extra bones to capture effects like muscle bulging. These extra bones increase complexity, are non-physical, and are non-intuitive for artists. Our blend shapes are simpler, more intuitive, more practical, and offer greater realism. Similarly, Wang et al. [2007] introduce joints related to surface deformation. Their rotational regression approach uses deformation gradients, which then must be converted to a vertex representation.

Learning Pose and Shape Models.

The above methods focus on learning poseable single-shape models. What is needed, however, are realistic poseable models that cover the space of human shape variation. Early methods use PCA to characterize a space of human body shapes [Allen et al. 2003; Seo et al. 2003] but do not model how body shape changes with pose. The most successful class of models are based on SCAPE [Anguelov et al. 2005] and represent body shape and pose-dependent shape in terms of triangle deformations rather than vertex displacements [Chen et al. 2013; Freifeld and Black 2012; Hasler et al. 2009; Hirshberg et al. 2012; PonsMoll et al. 2015]. These methods learn statistical models of shape variation from training scans containing different body shapes and poses. Triangle deformations provide allow the composition of different transformations such as body shape variation, rigid part rotation, and pose-dependent deformation. Weber et al. [2007] present an approach that has properties of SCAPE but blends this with example shapes. These models are not consistent with existing animation software.

Hasler et al. [2010] learn two linear blend rigs: one for pose and one for body shape. To represent shape change, they introduce abstract bones that control the shape change of the vertices. Animating a character of a particular shape involves manipulating the shape and pose bones. They learn a base mesh and blend weights but not blend shapes. Consequently, the model lacks realism.

Allen et al. [2006] formulate a vertex-based model that has the expressive power of the triangle deformation models so that it can capture a whole range of natural shapes and poses. For a given base body shape, they define a standard LBS model with scattered/exemplar PSD to model pose deformations, using radial basis functions for scattered data interpolation, shape-dependent pose deformations, and a fixed set of carrying angles. Consequently training it is also complex and requires a good initialization. They greedily define key angles at which to represent corrective blend shapes and they hold these fixed across all body shapes. A given body shape is parameterized by the vertices of the rest pose, corrective blend shapes (at the key angles), and bone lengths; these comprise a character vector. Given different character vectors for different bodies, they learn a low-dimensional latent space that lets them generalize character vectors to new body shapes; they learn these parameters from data. However, they had limited data and difficulty with overfitting so they restricted their body shape PCA space. As a result, the model did not generalize well to new shapes and poses. Their model is complex, has few parameters, and is learned from much less data.

Statistical body models aim to describe the surface of humans or animals in a low-dimensional space. These models rely on sparse or dense surface data captured from cooperative, easy-to-instruct subjects or 3D toy models. Infants present a major challenge in terms of data acquisition, as they are not cooperative and cannot be instructed. The inventors are not aware of a repository of high quality scans of infants.

Moreover, the general movement assessment (GMA) method achieves the highest reliability for the diagnosis and prediction of CP at such an early age. Trained experts, usually physicians, analyze video recordings of infants and rate the GM quality, ranging from normal optimal to definitely abnormal in a modified version of Prechtl's GMA [5]. Infants with abnormal movement quality have very high risk of developing CP or minor neurological dysfunction.

Despite being the most accurate clinical tool for early diagnosis, GMA requires a trained expert and suffers from human variability. These experts need regular practice and re-calibration to assure adequate ratings. This motivates the need for automated analysis. To allow GMA automation, a practical system must first demonstrate that it is capable of capturing the relevant information needed for GMA. Moreover, to allow its widespread use, the solution needs to be seamlessly integrated into the clinical routine. Ideally, it should be low-cost, easy-to-setup, and easy-to-use, producing minimal overhead to the standard examination protocol, and not affect the behavior of the infants.

For automated analysis, accurately capturing the motions of freely moving infants is key and has been approached in different ways. Intrusive systems rely on markers captured by camera systems, or on sensors attached to the infant's limbs, like electro-magnetic sensors or accelerometers. These approaches are highly accurate, since measurement units are directly connected to the limbs. However, the sensors/markers affect the infant's behavior. In addition, the setup and calibration of such systems can be cumbersome, the hardware is often expensive and the acquisition protocol requires time-consuming human intervention. Non-intrusive systems rely on simple, low-cost video or depth cameras, which facilitates usage in a broad clinical environment. From raw RGB videos, different body parts are tracked using optical flow or weakly supervised motion segmentation techniques. RGB-D sensors allow capturing motion in all three dimensions, e.g. by estimating joint positions based on a random ferns body part classifier.

OBJECT OF THE INVENTION

It is therefore an object of the invention, to provide a method and a device for learning a model of the body automatically, particularly of an infant's body that is both realistic and compatible with existing graphics software. It is a further object of the invention to make the body model as standard as possible so that it can be widely used, while, at the same time, keeping the realism of deformation-based models learned from data.

A BRIEF DESCRIPTION OF THE INVENTION

These objects are achieved by a method and a device according to the independent claims. Advantageous embodiments are defined in the dependent claims. In particular, the invention comprises a Skinned Multi-Person Linear (SMPL) model of the human body that can realistically represent a wide range of human body shapes, can be posed with natural pose-dependent deformations, exhibits soft-tissue dynamics, is efficient to animate, and is compatible with existing rendering engines.

The invention provides a human body model that captures body shape and pose variation as well as, or better than, the best previous models while being compatible with existing graphics pipelines and software. To that end, the invention uses standard skinning equations, defines body shape and pose blend shapes that modify the base mesh. The pose blend shapes depend on the elements of body part rotation matrices. The model may be trained on thousands of aligned scans of different people in different poses. The form of the model makes it possible to learn the parameters from large amounts of data while directly minimizing vertex reconstruction error. In one embodiment of the invention, the rest template, joint regressor, body shape model, pose blend shapes, and dynamic blend shapes are learned. Using 4D registered meshes, SMPL may also be extended to model dynamic soft-tissue deformations as a function of poses over time using an autoregressive model. SMPL can be exported as an FBX file According to another embodiment of the invention, blend shapes may be learned to correct for the limitations of standard skinning. Different blend shapes for identity, pose, and soft-tissue dynamics may be additively combined with a rest template before being transformed by blend skinning. The pose blend shapes may be formulated as a linear function of the pose, in particular as linear function of elements of the part rotation matrices. This formulation is different from previous methods [Allen et al. 2006; Merry et al. 2006; Wang and Phillips 2002] and makes training and animating with the blend shapes simple. Because the elements of rotation matrices are bounded, so are the resulting deformations, helping the invention model to generalize better.

The model admits an objective function that penalizes the per vertex disparities between registered meshes and our model, enabling training from data. To learn how people deform with pose, 1786 high-resolution 3D scans of different subjects may be used in a wide variety of poses. The template mesh is aligned to each scan to create a training set. The blend weights, pose-dependent blend shapes, the mean template shape (rest pose), and a regressor from shape to joint locations are optimized to minimize the vertex error of the model on the training set. This joint regressor predicts the location of the joints as a function of the body shape and is critical to animating realistic pose-dependent deformations for any body shape. All parameters are estimated automatically from the aligned scans.

Linear models of male and female body shape may be learned from the CAESAR dataset [Robinette et al. 2002] (approximately 2000 scans per gender) using principal component analysis (PCA). First, a template mesh is registered to each scan and the data is pose normalized, which is critical when learning a vertex-based shape model. The resulting principal components become body shape blend shapes.

The SMPL model may be extended to capture soft-tissue dynamics by adapting the Dyna model [Pons-Moll et al. 2015]. The resulting Dynamic-SMPL, or DMPL model, is trained from the same dataset of 4D meshes as Dyna. DMPL, however, is based on vertices instead of triangle deformations. Vertex errors are computed between SMPL and Dyna training meshes, transformed into the rest pose, and use PCA to reduce the dimensionality, producing dynamic blend shapes. A soft-tissue model is then trained based on angular velocities and accelerations of the parts and the history of dynamic deformations as in [Pons-Moll et al. 2015]. Since soft-tissue dynamics strongly depend on body shape, DMPL may be trained using bodies of varying body mass index and a model of dynamic deformations may be learned that depends of body shape. The surprising result is that, when BlendSCAPE and the inventive model are trained on exactly the same data, the vertex-based model is more accurate and significantly more efficient to render than the deformation based model. Also surprising is that a relatively small set of learned blend shapes do as good a job of correcting the errors of LBS as they do for DQBS.

Animating soft-tissue dynamics in a standard rendering engine only requires computing the dynamic linear blend shape coefficients from the sequence of poses. Side-by-side animations of Dyna and DMPL reveal that DMPL is more realistic. This extension of SMPL illustrates the generality of the inventive additive blend shape approach, shows how deformations can depend on body shape, and demonstrates how the approach provides an extensible foundation for modeling body shape.

SMPL models can be animated significantly faster than real time on a CPU using standard rendering engines. Consequently, the invention addresses an open problem in the field; it makes a realistic learned model accessible to animators. The inventive base template is designed with animation in mind; it has a low-polygon count, a simple vertex topology, clean quad structure, a standard rig, and reasonable face and hand detail (though the hands or face are not rigged here). Models according to the invention can be represented as an Autodesk Filmbox (FBX) file that can be imported into animation systems.

Finally, the methods presented herein are particularly applicable to 3D shape and 3D pose estimation of infants, as well as to learning a statistical 3D body model from low quality, incomplete RGB-D data of freely moving humans. The invention contributes a new statistical Skinned Multi-Infant Linear model (SMIL), learned from 37 RGB-D low-quality sequences of freely moving infants, and (ii) a method to register the model to the RGB-D sequences, capable of handling severe occlusions and fast movements. Quantitative experiments show how the new statistical infant model properly factorizes the pose and the shape of the infants, and allows the captured data to be accurately represented in a low-dimensional space.

SMIL is a realistic, data-driven infant body model, learned from noisy, low quality, incomplete RGB-D data, as well as a method to register SMIL to the data. Their combination allows the accurate capture of shape and 3D body motion of freely moving infants. Quantitative experiments showed that SMIL's metric accuracy is 2.5 mm.

BRIEF DESCRIPTION OF THE DRAWINGS

The patent or application file contains at least one drawing executed in color. Copies of this patent or patent application publication with color drawing(s) will be provided by the Office upon request and payment of the necessary fee.

Embodiments of the invention are described in more detail, in relation to the drawing in which

FIGS. 28A-28F: show two data samples created using SMIL containing: RGB image (a,d); point cloud from depth image (b, e) and ground truth skeleton (c, f). Viewpoint for (b), (c), (e), and (f) is slightly rotated to the side.

DETAILED EMBODIMENTS

Figure 1:
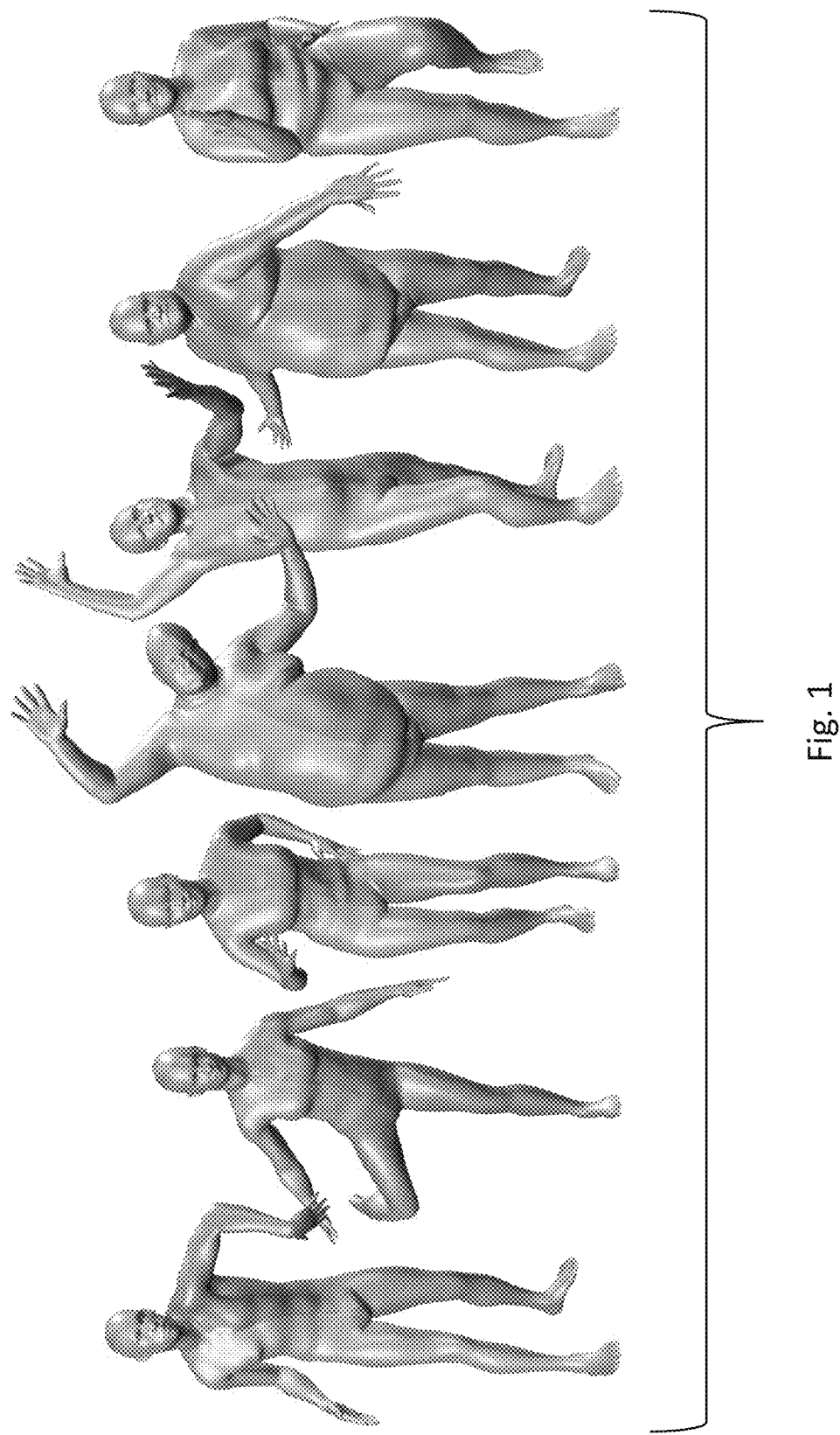
FIGS. 1 and 1a: (left) SMPL model (orange) fit to ground truth 3D meshes (gray). (right) Unity 5.0 game engine screenshot showing bodies from the CAESAR dataset animated in real time.
Figure 1A:

FIG. 1 shows a realistic learned model of human body shape and pose according to a first embodiment of the invention that is compatible with existing rendering engines and allows animator control using standard graphics tools. (left) SMPL model (orange) fit to ground truth 3D meshes (gray). (right) Unity 5.0 game engine screenshot showing bodies from the CAESAR dataset animated in real time.

Figure 2:
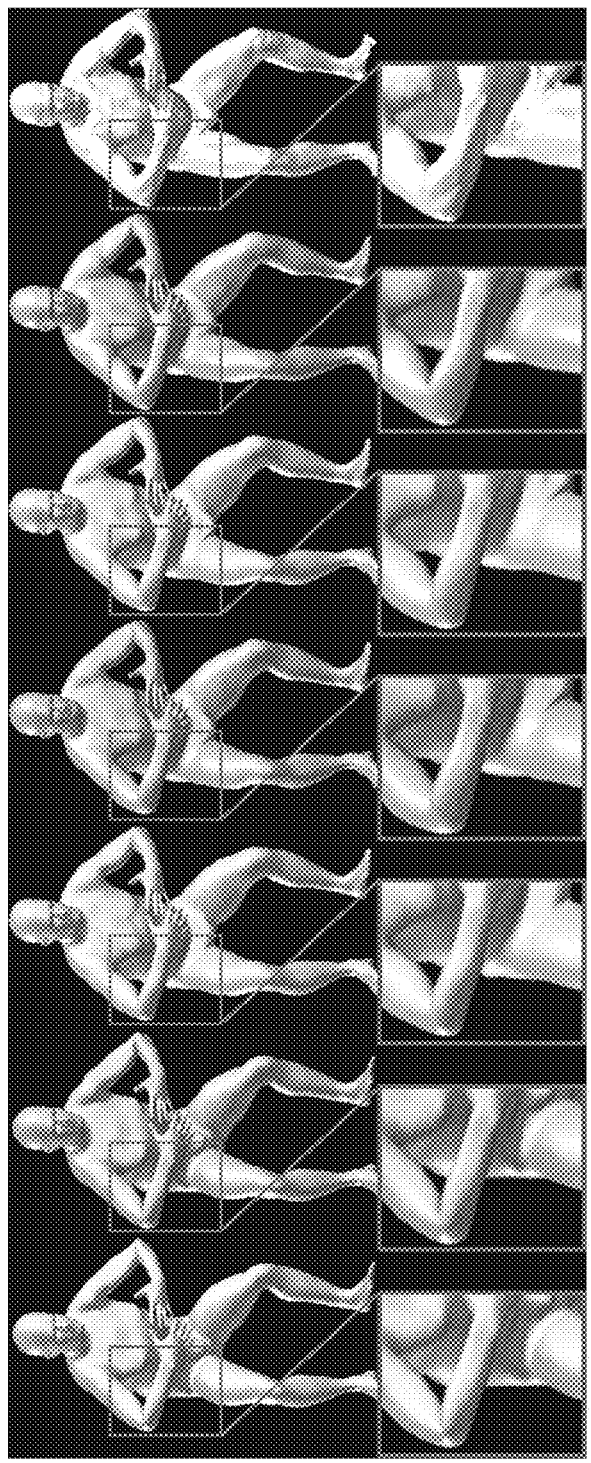
FIG. 2: shows models compared with ground truth. The far right (light gray) mesh is a 3D scan. Next to it (dark gray) is a registered mesh with the same topology as our model. We ask how well different models can approximate this registration. From left to right: (light green) Linear blend skinning (LBS), (dark green) Dualquaternion blend skinning (DQBS), (blue) BlendSCAPE, (red) SMPL-LBS, (orange) SMPL-DQBS. The zoomed regions highlight differences between the models at the subject's right elbow and hip. LBS and DQBS produce serious artifacts at the knees, elbows, shoulders and hips. BlendSCAPE and both SMPL models do similarly well at fitting the data.

FIG. 2 compares models with ground truth. More particularly, the inventive model is trained in various forms and compared quantitatively to a BlendSCAPE model [Hirshberg et al. 2012], trained with exactly the same data. The models are both evaluated qualitatively with animations and quantitatively using meshes that were not used for training. SMPL and BlendSCAPE are fit to these meshes and then the vertex errors are compared. Two main variants of SMPL are explored, one using linear blend skinning (LBS) and the other with Dual-Quaternion blend skinning (DQBS).

The far right (light gray) mesh is a 3D scan. Next to it (dark gray) is a registered mesh with the same topology as the inventive model. The comparison shows how well different models can approximate this registration. From left to right: (light green) Linear blend skinning (LBS), (dark green) Dual-Quaternion blend skinning (DQBS), (blue) BlendSCAPE, (red) SMPL-LBS, (orange) SMPL-DQBS. The zoomed regions highlight differences between the models at the subject's right elbow and hip. LBS and DQBS produce serious artifacts at the knees, elbows, shoulders and hips. BlendSCAPE and both SMPL models do similarly well at fitting the data.

Surprisingly, the vertex-based, skinned, model according to the invention is actually more accurate than a deformation-based model like BlendSCAPE trained on the same data.

Figure 6B:
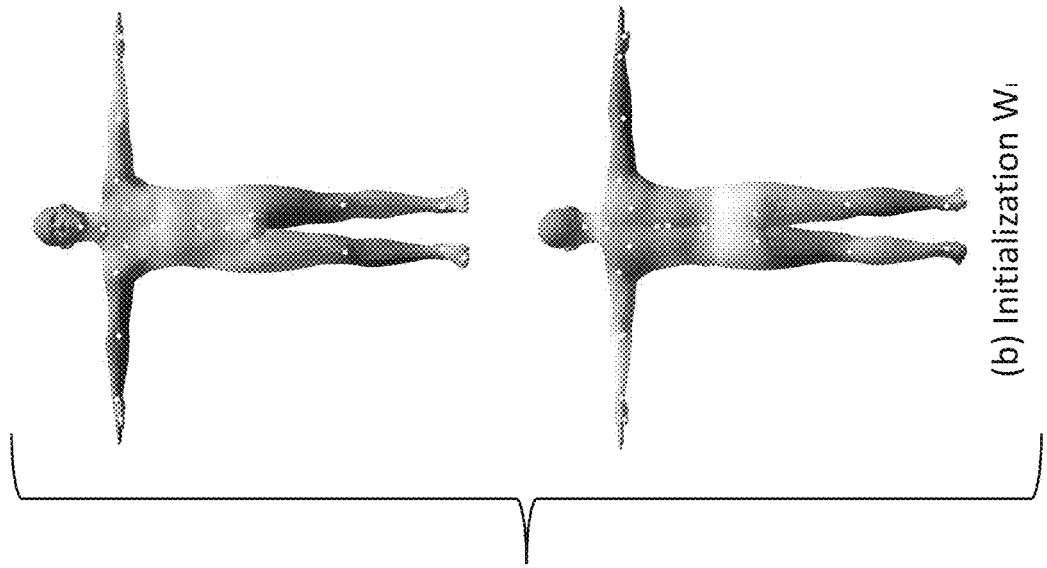
FIGS. 6A-6B: show initialization of joints and blend weights. Discrete part segmentation in (a) is diffused to obtain initial blend weights, $W_I$, in (b). Initial joint centers are shown as white dots.
Figure 6A:
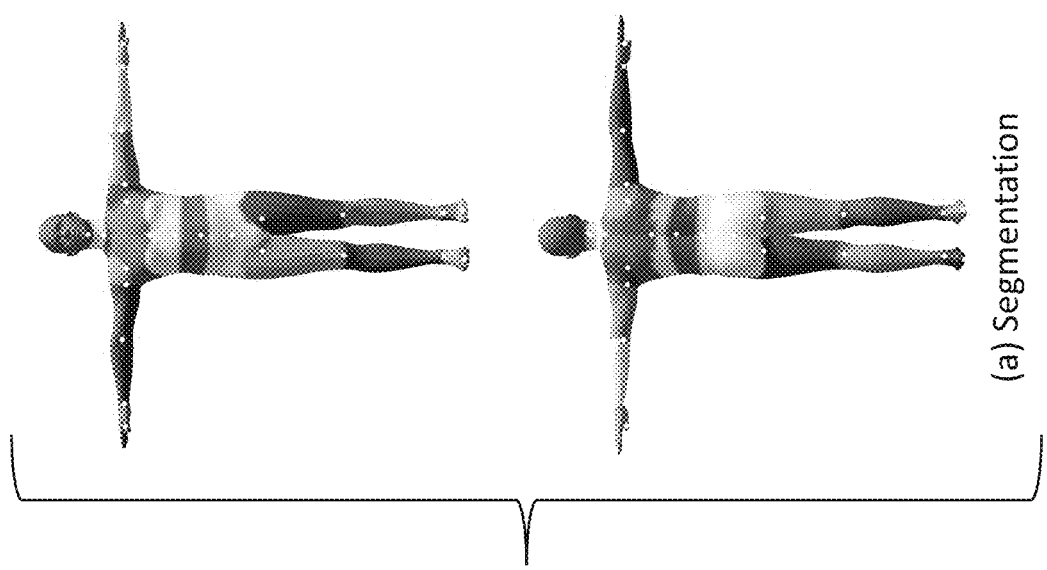

FIGS. 3A-3D show an illustration of the skinned multi-person linear model according to the invention. Like SCAPE, the SMPL model decomposes body shape into identity-dependent shape and non-rigid pose-dependent shape; unlike SCAPE, the invention takes a vertex-based skinning approach that uses corrective blend shapes. A single blend shape is represented as a vector of concatenated vertex offsets. The method begins with an artist created mesh with N=6890 vertices and K=23 joints. The mesh has the same topology for men and women, spatially varying resolution, a clean quad structure, a segmentation into parts, initial blend weights, and a skeletal rig. The part segmentation and initial blend weights are shown in FIGS. 6A-6B.

Figure 3A:
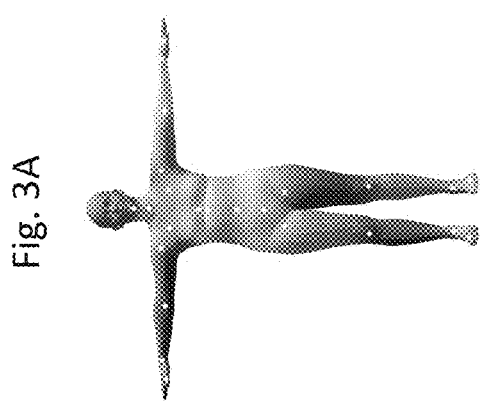
FIGS. 3A, 3B, 3C, and 3D: show a SMPL model according to an embodiment of the invention. (a) Template mesh with blend weights indicated by color and joints shown in white. (b) With identity-driven blendshape contribution only; vertex and joint locations are linear in shape vector $\vec{\beta}$. (c) With the addition of pose blend shapes in preparation for the split pose; note the expansion of the hips. (d) Deformed vertices reposed by dual quaternion skinning for the split pose.
Figure 3B:
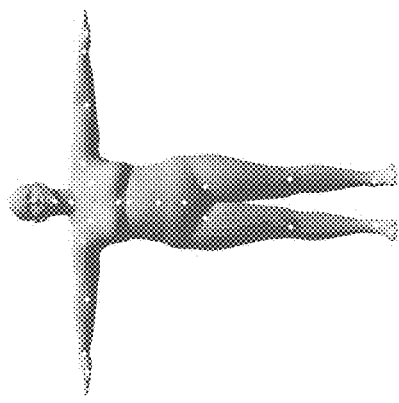
Figure 3C:
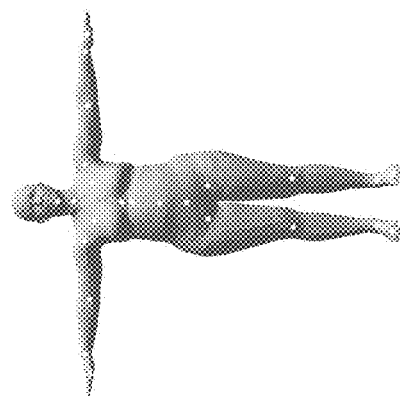
Figure 3D:
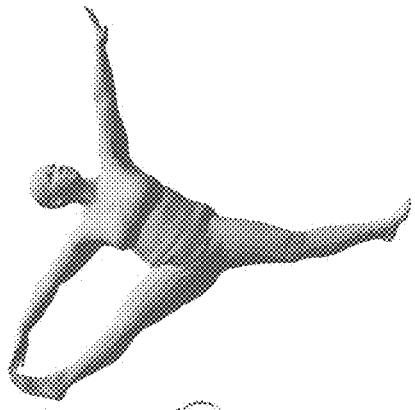

Following standard skinning practice, the model is defined by a mean template shape represented by a vector of N concatenated vertices $T \in \Re^{3N}$ in the zero pose, $\vec{\theta}^*$; a set of blend weights, $W \in \Re^{N \times K}$, (FIG. 3A); a blend shape function, $B_S(\vec{\beta}): \Re^{|\vec{\beta}|} \to \Re^{3N}$, that takes as input a vector of shape parameters, $\vec{\beta}$, (FIG. 3B) and outputs a blend shape sculpting the subject identity; a function to predict K joint locations (white dots in FIG. 3B), $J(\vec{\beta}): \Re^{|\vec{\beta}|} \to \Re^{3K}$ as a function of shape parameters, $\vec{\beta}$; and a pose-dependent blend shape function, $B_P(\vec{\theta}): \Re^{|\vec{\theta}|} \to \Re^{3N}$, that takes as input a vector of pose parameters, $\vec{\theta}$, and accounts for the effects of pose-dependent deformations (FIG. 3(c)). The corrective blend shapes of these functions are added together in the rest pose as illustrated in (FIG. 3C. Finally, a standard blend skinning function $W(\cdot)$ (linear or dual-quaternion) is applied to rotate the vertices around the estimated joint centers with smoothing defined by the blend weights. The result is a model, $M(\vec{\beta}, \vec{\theta}; \phi): \Re^{|\vec{\theta}| \times |\vec{\beta}|} \to \Re^{3N}$, that maps shape and pose parameters to vertices (FIG. 3(d)). Here $\phi$ represents the learned model parameters described below.

Both LBS and DQBS skinning methods will be used below. In general the skinning method can be thought of as a generic black box. Given a particular skinning method our goal is to learn $\phi$ to correct for limitations of the method so as to model training meshes. Note that the learned pose blend shapes both correct errors caused by the blend skinning function and static soft-tissue deformations caused by changes in pose.

Blend Skinning.

To fix ideas and define notation, the LBS version is presented as it makes exposition clear (the DQBS version of SMPL only requires changing the skinning equation). Meshes and blend shapes are vectors of vertices represented by bold capital letters (e.g. X) and lowercase bold letters (e.g. $x_i \in \Re^3$) are vectors representing a particular vertex. The vertices are sometimes represented in homogeneous coordinates. The same notation is used for a vertex whether it is in standard or homogeneous coordinates as it should always be clear from the context which form is needed.

The pose of the body is defined by a standard skeletal rig, where $\vec{w}_k \in \Re^3$ denotes the axis-angle representation of the relative rotation of part k with respect to its parent in the kinematic tree. In the present embodiment, the rig has K=23 joints, hence a pose $\vec{\theta} = [\vec{w}_0^T, \ldots, \vec{w}_K^T]^T$ is defined by $|\vec{\theta}| = 3 \times 23 + 3 = 72$ parameters; i.e. 3 for each part plus 3 for the root orientation. Let $$\bar{w} = \frac{\vec{w}}{\|\vec{w}\|}$$

denote the unit norm axis of rotation. Then the axis angle for every joint j is transformed to a rotation matrix using the Rodrigues formula.

$$\exp(\vec{w}_j) = I + \hat{\bar{w}}_j \sin(\|\vec{w}_j\|) + \hat{\bar{w}}_j^2 (1 - \cos(\|\vec{w}_j\|)) \quad (1)$$

where $\bar{w}$ is the skew symmetric matrix of the 3-vector $\bar{w}$ and I is the 3×3 identity matrix. Using this, the standard linear blend skinning function $$W(\bar{T},J,\vec{\theta},W): \mathfrak{R}^{3N\times 3K\times|\vec{\theta}|\times|W|} \to \mathfrak{R}^{3N}$$

takes vertices in the rest pose, T, joint locations, J, a pose, $\vec{\theta}$; and the blend weights, $\omega$, and returns the posed vertices. Each vertex $\bar{t}_i$ in T is transformed into $\bar{t}_i'$ (both column vectors in homogeneous coordinates) as $$\bar{t}_i' = \sum_{k=1}^{K} w_{k,i} G_k'(\vec{\theta}, J) \bar{t}_i \qquad (2)$$

$$G_k'(\vec{\theta}, J) = G_k(\vec{\theta}, J) G_k(\vec{\theta}^*, J)^{-1} \qquad (3)$$

$$G_k(\vec{\theta}, J) = \prod_{j \in A(k)} \begin{bmatrix} \exp(\vec{w}_j) & j_j \\ \vec{0} & 1 \end{bmatrix} \qquad (4)$$

where $w_{k,i}$ is an element of the blend weight matrix W, representing how much the rotation of part k effects the vertex i, $\exp(\vec{\theta}_j)$ is the local 3×3 rotation matrix corresponding to joint j, $G_k'(\vec{\theta},J)$ is the world transformation of joint k, and $G_k'(\bar{\theta},J)$ is the same transformation after removing the transformation due to the rest pose, $\vec{\theta}^*$. Each 3-element vector in J corresponding to a single joint center, j, is denoted $j_j$. Finally, A(k) denotes the ordered set of joint ancestors of joint k. Note, for compatibility with existing rendering engines, it is assumed that W is sparse and at most four parts are allowed to influence a vertex.

Many methods have modified equation (2) to make skinning more expressive. For example MWE [Wang and Phillips 2002] replaces $G_k(\vec{\theta},J)$ with a more general affine transformation matrix and replaces the scalar weight with a separate weight for every element of the transformation matrix. Such changes are expressive but are not compatible with existing animation systems.

To maintain compatibility, the basic skinning function may be kept and instead the template may be modified in an additive way and a function is learned to predict joint locations. The model, $M(\vec{\beta}, \vec{\theta}; \phi)$ is then $$M(\vec{\beta},\vec{\theta}) = W(T_P(\vec{\beta},\vec{\theta}), J(\vec{\beta}), \vec{\theta}, W) \qquad (5)$$

$$T_P(\vec{\beta},\vec{\theta}) = \bar{T} + B_S(\vec{\beta}) + B_P(\vec{\theta}) \qquad (6)$$

where $B_S(\vec{\beta})$ and $B_P(\vec{\theta})$ are vectors of vertices representing offsets from the template. These are referred to as shape and pose blend shapes respectively.

Given this definition, a vertex $\bar{t}_i$ is transformed according to $$\bar{t}_i' = \sum_{k=1}^{K} w_{k,i} G_k'(\vec{\theta}, J(\vec{\beta}))(\bar{t}_i + b_{S,i}(\vec{\beta}) + b_{P,i}(\vec{\theta})) \qquad (7)$$

where $b_{S,i}(\vec{\beta})$, $b_{P,i}(\vec{\theta})$ are vertices in $B_S(\vec{\beta})$ and $B_P(\vec{\theta})$ respectively and represent the shape and pose blend shape offsets for the vertex $\bar{t}_i$. Hence, the joint centers are now a function of body shape and the template mesh that is deformed by blend skinning is now a function of both pose and shape.

Shape Blend Shapes.

The body shapes of different people are represented by a linear function $B_S$ $$B_S(\vec{\beta}; S) = \sum_{n=1}^{|\vec{\beta}|} \beta_n S_n \qquad (8)$$

where $\vec{\beta} = [\beta_1, \ldots, \beta_{|\vec{\beta}|}]^T$, $|\vec{\beta}|$ is the number of linear shape coefficients, and they $S_n \in \mathfrak{R}^{3N}$ represent orthonormal principal components of shape displacements. Let $S = [S_1, \ldots, S_{|\vec{\beta}|}] \in \mathfrak{R}^{3N\times|\vec{\beta}|}$ be the matrix of all such shape displacements. Then the linear function $B_S(\vec{\beta};S)$ is fully defined by the matrix S, which is learned from registered training meshes.

Notationally, the values to the right of a semicolon represent learned parameters, while those on the left are parameters set by an animator. For notational convenience, the learned parameters are often omitted when they are not explicitly being optimized in training.

FIG. 3B illustrates the application of these shape blend shapes to the template $\bar{T}$ to produce a new body shape.

Pose Blend Shapes.

R denotes: $R: \mathfrak{R}^{|\vec{\theta}|} \to \mathfrak{R}^{9K}$ a function that maps a pose vector $\vec{\theta}$ to a vector of concatenated part relative rotation matrices, $\exp(\vec{w})$. Given that the rig has 23 joints, $R(\vec{\theta})$ is a vector of length (23×9=207). Elements of $R(\vec{\theta})$ are functions of sines and cosines (Eq. (19)) of joint angles and therefore $R(\vec{\theta})$ is non-linear with $\vec{\theta}$.

This formulation differs from previous work in that the effect of the pose blend shapes is defined to be linear in $R^*(\vec{\theta}) = (R(\vec{\theta}) - R(\vec{\theta}^*))$, where $\vec{\theta}^*$ denotes the rest pose. Let $R_n(\vec{\theta})$ denote the $n_{th}$ element of $R(\vec{\theta})$, then the vertex deviations from the rest template are $$B_P(\vec{\theta}; P) = \sum_{n=1}^{9K} (R_n(\vec{\theta}) - R_n(\vec{\theta}^*)) P_n \qquad (9)$$

where the blend shapes, $P_n \in \mathfrak{R}^{3N}$, are again vectors of vertex displacements. Here $P = [P_1, \ldots, P_{9K}] \in \mathfrak{R}^{3N\times 9K}$ is a matrix of all 207 pose blend shapes. In this way, the pose blend shape function $B_P(\vec{\theta};P)$ is fully defined by the matrix P.

Subtracting the rest pose rotation vector $R(\vec{\theta})$ guarantees that the contribution of the pose blend shapes is zero in the rest pose, which is important for animation.

Joint Locations.

Different body shapes have different joint locations. Each joint is represented by its 3D location in the rest pose. It is critical that these are accurate, otherwise there will be artifacts when the model is posed using the skinning equation. For that reason, the joints are defined as a function of the body shape, $\vec{\beta}$, $$J(\vec{\theta}; \mathfrak{I}, \bar{T}, S) = \mathfrak{I}(\bar{T} + B_S(\vec{\beta};S)) \qquad (10)$$

where $\Im$ is a matrix that transforms rest vertices into rest joints. The regression matrix, $\Im$, is learned from examples of different people in many poses. This matrix models which mesh vertices are important and how to combine them to estimate the joint locations.

Smpl Model.

One can now specify the full set of model parameters of the SMPL model as $\phi=\{T,W,S,J,P\}$. Once learned they are held fixed and new body shapes and poses are created and animated by varying $\vec{\beta}$ and $\vec{\theta}$ respectively.

Then the SMPL model is finally defined as $$M(\vec{\beta},\vec{\theta};\phi)=W(T_P(\vec{\beta},\vec{\theta},T,S,P),J(\vec{\beta};\Im,T,S),\vec{\theta},W) \quad (11)$$

and hence each vertex is transformed as $$t'_i = \sum_{k=1}^{K} w_{k,i} G'_k(\vec{\theta}, J(\vec{\beta};\Im,T,S)) t_{P,i}(\vec{\beta},\vec{\theta};T,S,P) \quad (12)$$

Where $$t_{P,i}(\vec{\beta},\vec{\theta};T,S,P) = \bar{t}_i + \sum_{m=1}^{|\vec{\beta}|} \beta_m s_{m,i} + \sum_{n=1}^{9K} (R_n(\vec{\theta}) - R_n(\vec{\theta}^*)) p_{n,i} \quad (13)$$

represents the vertex i after applying the blend shapes and where $s_{m,i}, p_{n,i} \in \Re^3$ are the elements of the shape and pose blend shapes corresponding to template vertex $\bar{t}_i$.

Below, experiments with both LBS and DQBS are described, wherein the parameters are trained for each. These models are referred to as SMPL-LBS and SMPL-DQBS; SMPL-DQBS is the default model, and SMPL is used as shorthand to mean SMPL-DQBS.

Training

Figure 4:
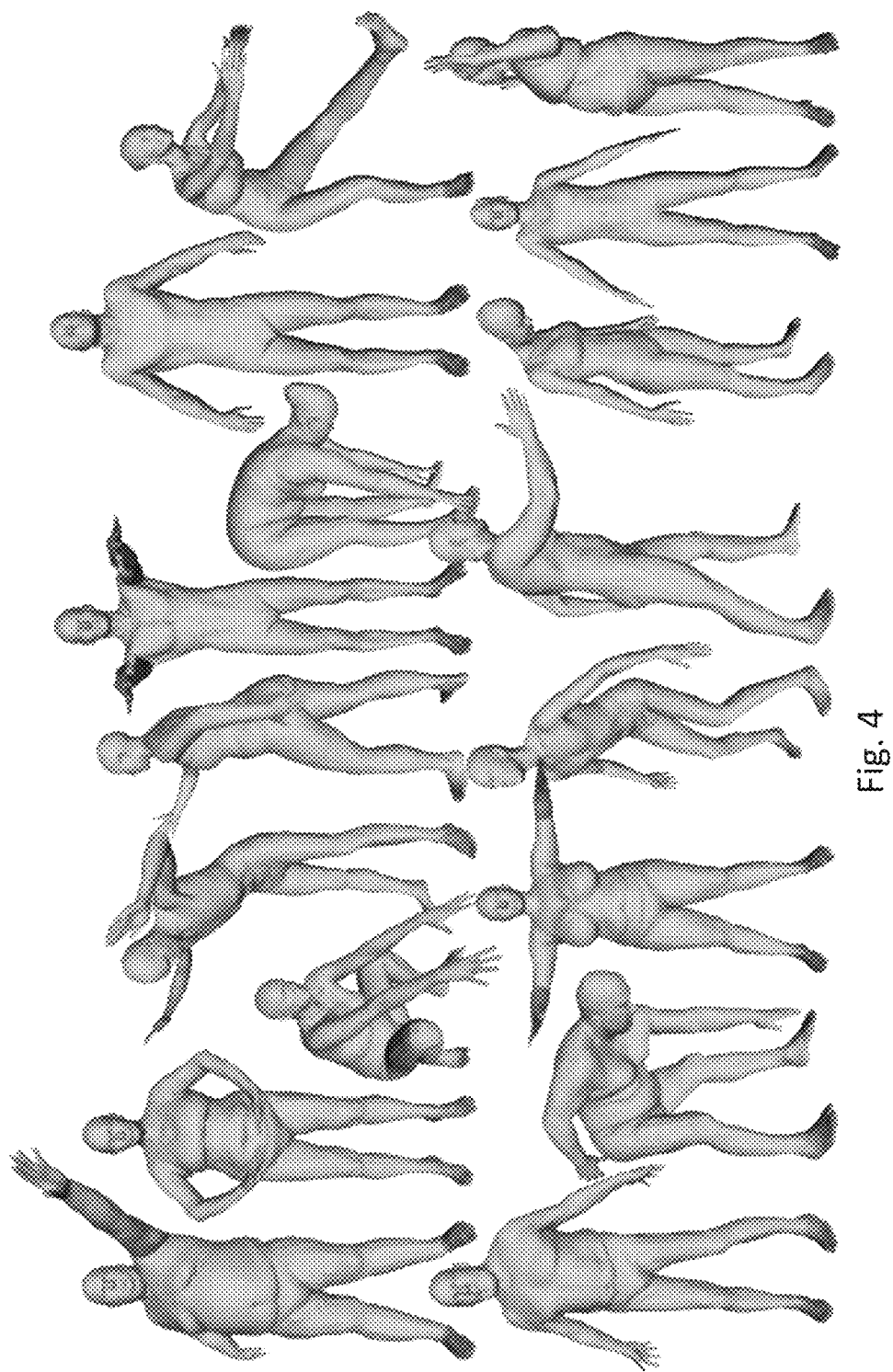
FIG. 4: shows sample registrations from the multi-pose dataset.
Figure 5:
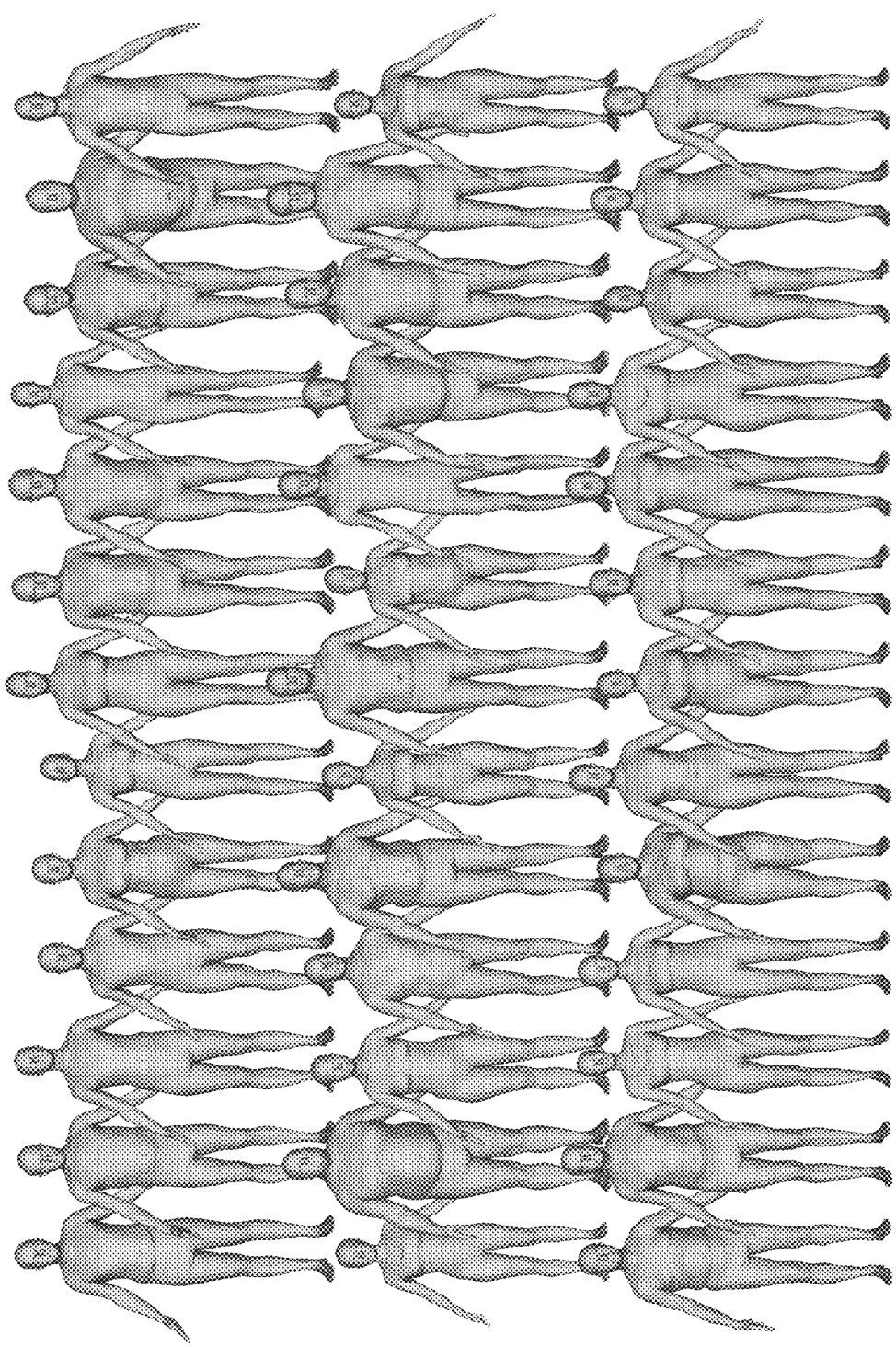
FIG. 5: shows sample registrations from the multishape dataset.

The SMPL model parameters are trained to minimize reconstruction error on two datasets. Each dataset contains meshes with the same topology as our template that have been aligned to high-resolution 3D scans using [Bogo et al. 2014]; these aligned meshes are called "registrations"; The multi-pose dataset consists of 1786 registrations of 40 individuals (891 registrations spanning 20 females, and 895 registrations spanning 20 males); a sampling is shown in FIG. 4. The multi-shape dataset consists of registrations to the CAESAR dataset [Robinette et al. 2002], totaling 1700 registrations for males and 2100 for females; a few examples are shown in FIG. 5. The $j^{th}$ mesh in the multi-pose dataset is denoted as $V_j^P$ and the $j^{th}$ mesh in the multi-shape dataset as $V_j^S$.

According to the invention, the parameters $\phi=\{T,W,S,J,P\}$ are trained to minimize a vertex reconstruction error on the datasets. Because the model decomposes shape and pose, these are trained separately, simplifying optimization. First, $\{\Im,\omega,P\}$ is trained using a multi-pose dataset and then $\{T,S\}$ is trained using our multi-shape dataset. Separate models are trained for men and women (i.e. $\phi_m$ and $\phi_f$)

First, the multi-pose dataset is used to train $\{\Im,\omega,P\}$ this end, one needs to compute the rest templates, $\hat{T}_i^P$, and joint locations, $\hat{J}_i^P$, for each subject, i, as well as the pose parameters, $\vec{\theta}_j$, for each registration, j, in the dataset. The alternates framing method between optimizing registration specific parameters $\vec{\theta}_j$, subject-specific parameters $\{\hat{T}_i^P, \hat{J}_i^P\}$, and global parameters $\{W,P\}$. Then the matrix, $\Im$, is learned to regress from subject-specific vertex locations, $\hat{T}_i^P$, to subject-specific joint locations, $\hat{J}_i^P$. To achieve all this, one minimizes an objective function consisting of a data term, $E_D$, and several regularization terms $\{E_J, E_Y, E_P, E_W\}$ defined below.

The data term penalizes the squared Euclidean distance between registration vertices and model vertices $$E_D(\hat{T}^P, \hat{J}^P, W, P, \Theta) = \sum_{j=1}^{P_{reg}} \|V_j^P - W(\hat{T}_{s(j)}^P + B_P(\vec{\theta}_j; P), \hat{J}_{s(j)}^P, \vec{\theta}_j, W)\|^2$$

where $\Theta = \{\vec{\theta}_1, \ldots, \vec{\theta}_{P_{reg}}\}$, s(j) is the subject index corresponding to registration j, $P_{reg}$ are the number of meshes in the pose trainings set, $$\hat{T}^P = \{\hat{T}_i^P\}_{i=1}^{P_{subj}}, \hat{J}^P = \{\hat{J}_i^P\}_{i=1}^{P_{subj}}$$

are the sets of all rest poses and joints, and $P_{subj}$ is the number of subjects in the pose training set.

The method estimates 207×3×6890=4,278,690 parameters for the pose blend shapes, P, 4×3×6890=82,680 parameters for the skinning weights, W, and 3×6890×23×3=1,426,230 for the joint regressor matrix, $\Im$. To make the estimation well behaved, we regularize by making several assumptions. A symmetry regularization term, $E_Y$, penalizes left-right asymmetry for $\hat{J}^P$ and $\hat{T}^P$.

$$E_Y(\hat{J}^P, \hat{T}^P) = \sum_{i=1}^{P_{subj}} \lambda_U \|\hat{J}_i^P - U(\hat{J}_i^P)\|^2 + \|\hat{T}_i^P - U(\hat{T}_i^P)\|^2$$

where $\lambda_U=100$, and where U(T) finds a mirror image of vertices T, by flipping across the sagittal plane and swapping symmetric vertices. This term encourages symmetric template meshes and, more importantly, symmetric joint locations. Joints are unobserved variables and along the spine they are particularly difficult to localize. While models trained without the symmetry term produce reasonable results, enforcing symmetry produces models that are visually more intuitive for animation.

The model is hand segmented into 24 parts (FIG. 6). This segmentation is used to compute an initial estimate of the joint centers and a regressor $J_I$ from vertices to these centers. This regressor computes the initial joints by taking the average of the ring of vertices connecting two parts. When estimating the joints for each subject, they are regularized to be close to this initial prediction:

$$E_J(\hat{T}^P, \hat{J}^P) = \sum_{i=1}^{P_{subj}} \|\Im_I \hat{T}_i^P - \hat{J}_i^P\|^2$$

To help prevent overfitting of the pose-dependent blend shapes, they are regularized towards zero $$E_P(P) = \|P\|_F^2,$$

where $\|\cdot\|_F$ denotes the Frobenius norm. Replacing the quadratic penalty with an $L_1$ penalty would encourage greater sparsity of the blend shapes.

The blend weights are also regularized towards the initial weights, $\omega_I$, shown in FIGS. 6A-6B:

$$E_W(W) = \|W - W_I\|_F^2$$

The initial weights are computed by simply diffusing the segmentation.

Altogether, the energy for training $\{\omega, P\}$ is as follows:

$$E^*(\hat{T}^P,\hat{J}^P,\Theta,W,P)=E_D+\lambda_Y E_Y+\lambda_J E_J+\lambda_P E_P+E_w \quad (14)$$

where $\lambda_Y=100$, $\lambda_J=100$ and $\lambda_P=25$. These weights were set empirically. The model has a large number of parameters and the regularization helps prevent overfitting. As the size of the training set grows, so does the strength of the data term, effectively reducing the influence of the regularization terms. The experiments below with held-out test data suggest that the learned models are not overfit to the data and generalize well.

Joint Regressor.

Figure 7:
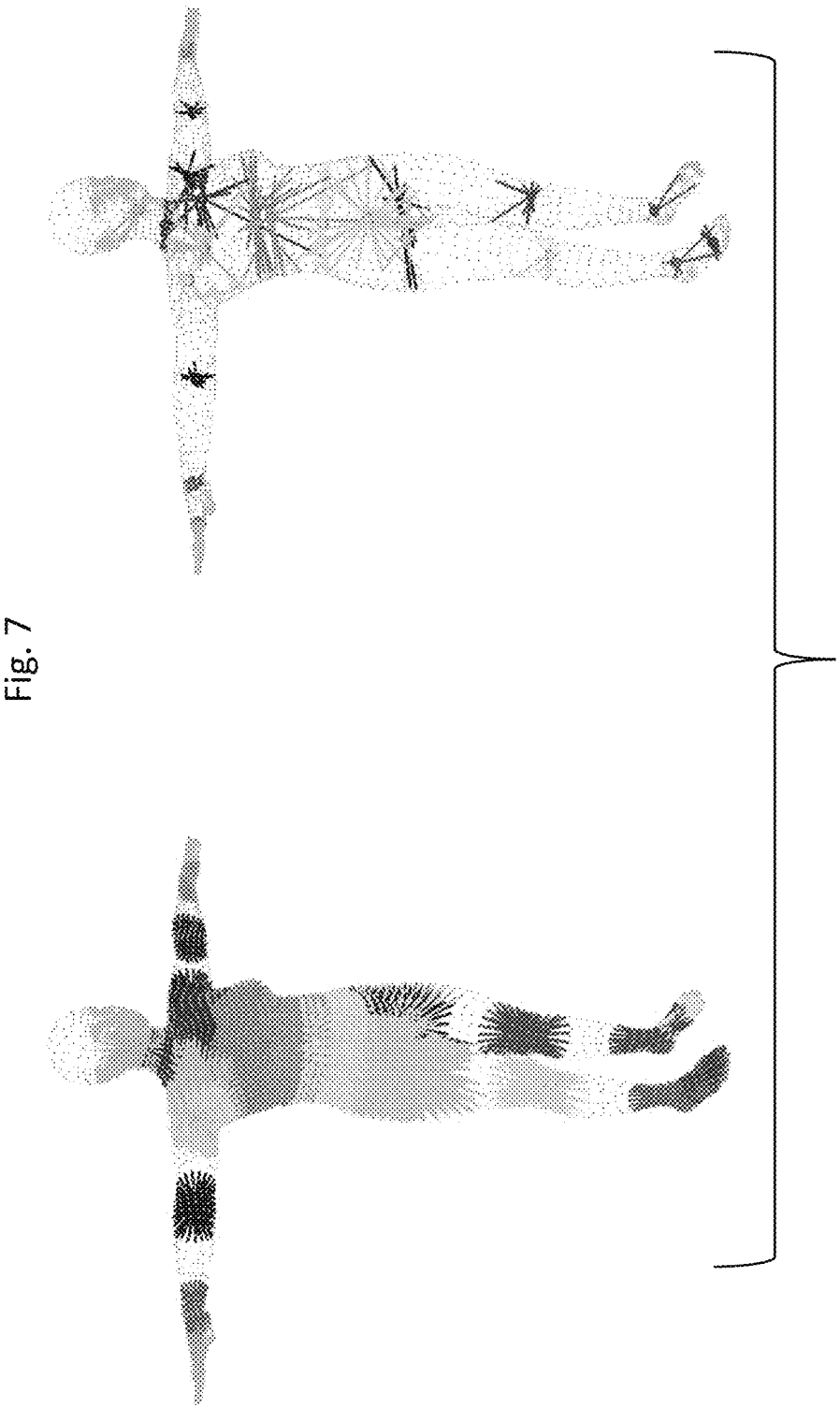
FIG. 7: shows a joint regression. (left) Initialization. Joint locations can be influenced by locations on the surface, indicated by the colored lines. It is assumed that these influences are somewhat local. (right) Optimized. After optimization a sparse set of vertices and associated weights influencing each joint are found.

Optimizing the above gives a template mesh and joint locations for each subject, but one wants to predict joint locations for new subjects with new body shapes. To that end, the regressor matrix $\Im$ is learned to predict the training joints from the training bodies. Several regression strategies were tried; what was found to work best, was to compute J using non-negative least squares [Lawson and Hanson 1995] with the inclusion of a term that encourages the weights to add to one. This approach encourages sparsity of the vertices used to predict the joints. Making weights positive and add to one discourages predicting joints outside the surface. These constraints enforce the predictions to be in the convex hull of surface points. FIG. 7 shows the non-zero elements of the regression matrix, illustrating that a sparse set of surface vertices are linearly combined to estimate the joint centers.

According to the invention, the shape space is defined by a mean and principal shape directions $\{T, S\}$. It is computed by running PCA on shape registrations from our multi-shape database after pose normalization. Pose normalization transforms a raw registration $V_j^S$ into a registration, $\hat{T}_j^S$, in the rest pose, $\vec{\theta}^*$. This normalization is critical to ensure that pose and shape are modeled separately.

To pose-normalize a registration, $V_j^S$, first its pose is estimated. $\hat{T}_\mu^P$ and $\hat{J}_\mu^P$ denote the mean shape and mean joint locations from the multi-pose database respectively. Let $W_e(\hat{T}_\mu^P, \hat{J}_\mu^P, \vec{\theta}, W)$, $V_{j,e}^S \in \mathfrak{R}^3$ denote an edge of the model and of the registration respectively. An edge is obtained by subtracting a pair of neighboring vertices. To estimate the pose using an average generic shape $\hat{T}_\mu^P$, the following sum of squared edge differences is minimized so that $\vec{\theta}_j=$ $$\underset{\vec{\theta}}{\operatorname{argmin}} \sum_e \|W_e(\hat{T}_\mu^P + B_P(\vec{\theta}; P), \hat{J}_\mu^P, \vec{\theta}, W) - V_{j,e}^S\|^2 \quad (15)$$

where the sum is taken over all edges in the mesh. This allows us to get a good estimate of the pose without knowing the subject specific shape.

Once the pose $\vec{\theta}_j$ is known we solve for $\hat{T}_j^S$ by minimizing $$\hat{T}_j^S = \underset{\hat{T}}{\operatorname{argmin}} \|W(\hat{T} + B_P(\vec{\theta}_j; P), \Im\hat{T}, \vec{\theta}_j, W) - V_j^S\|^2$$

This computes the shape that, when posed, matches the training registration. This shape is the pose-normalized shape.

We then run PCA on $\{\hat{T}_j^S\}_{j=1}^{S_{subj}}$ to obtain $\{T,S\}$. This procedure is designed to maximize the explained variance of vertex offsets in the rest pose, given a limited number of shape directions.

The optimization of pose is critically important when building a shape basis from vertices. Without this step, pose variations of the subjects in the shape training dataset would be captured in the shape blend shapes. The resulting model would not be decomposed properly into shape and pose. Note also that this approach contrasts with SCAPE or BlendSCAPE, where PCA is performed in the space of per-triangle deformations. Unlike vertices, triangle deformations do not live in a Euclidean space [Freifeld and Black 2012]. Hence PCA on vertices is more principled and is consistent with the registration data term, which consists of squared vertex disparities.

Figures 8A, 8B, 8C:
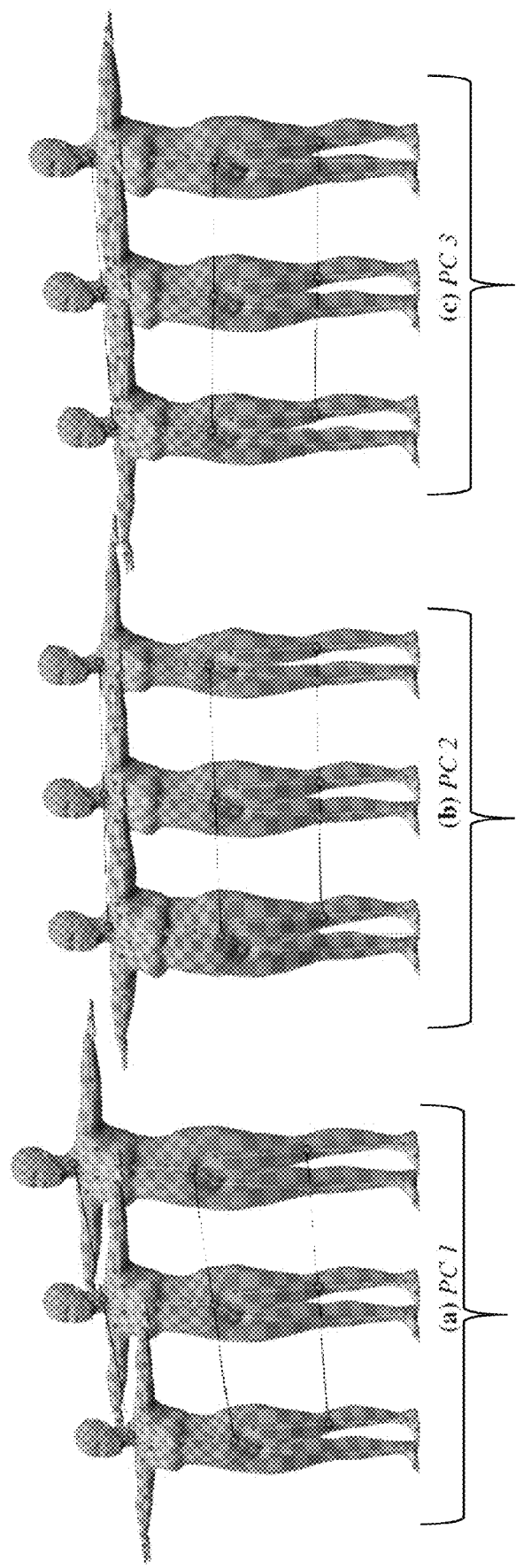
FIGS. 8A, 8B, 8C: show shape blend shapes. The first three shape principal components of body shape are shown. $PC_1$ and $PC_2$ vary from −2 to +2 standard deviations from left to right, while $PC_3$ varies from −5 to +5 standard deviations to make the shape variation more visible. Joint locations (red dots) vary as a function of body shape and are predicted using the learned regressor, $J$.

FIGS. 8A-8C visualize the first three shape components. The figures also shows how the joint locations change with the changes in body shape. The joint positions are shown by the spheres and are computed from the surface meshes using the learned joint regression function. The lines connecting the joints across the standard deviations illustrate how the joint positions vary linearly with shape.

Figure 9:
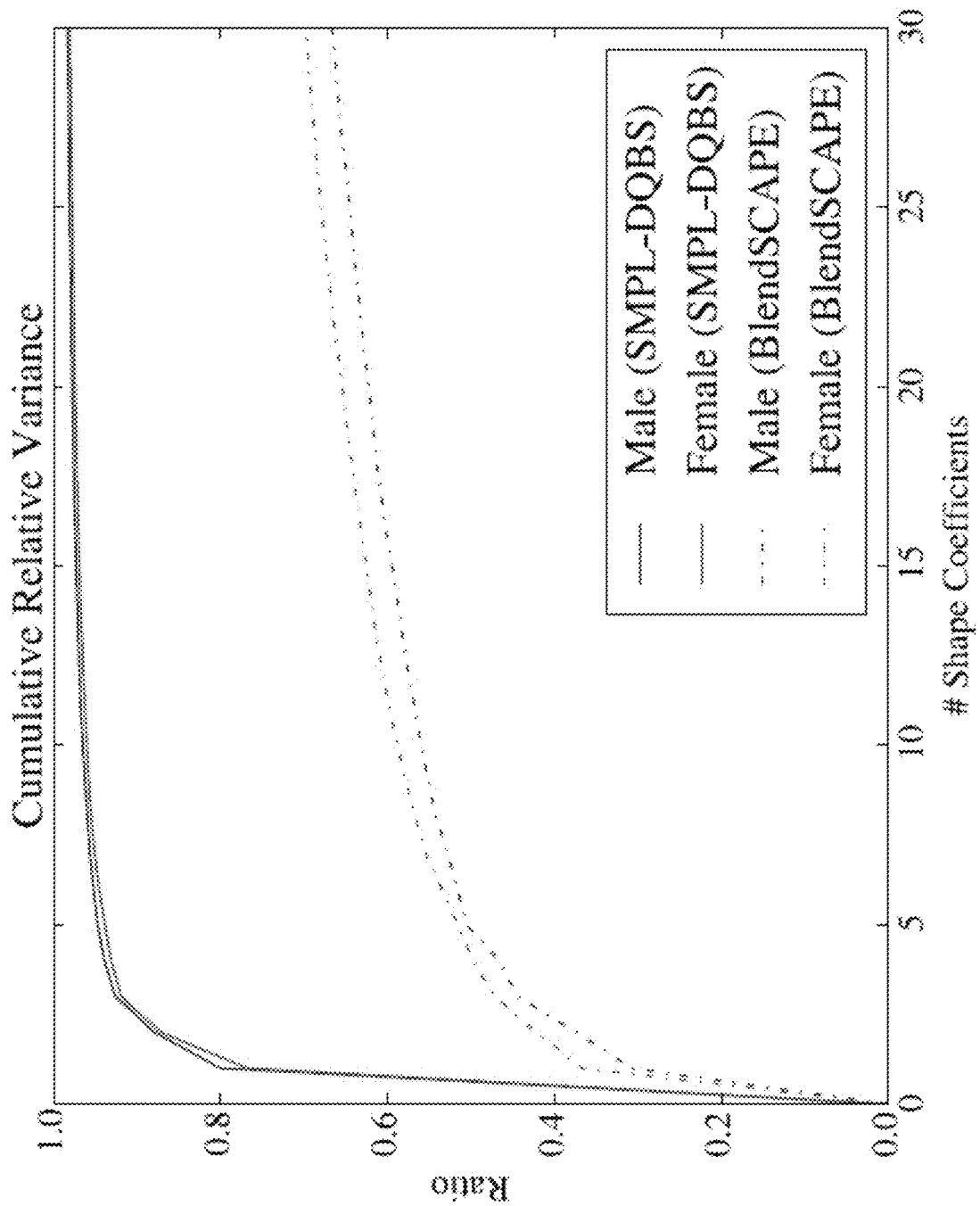
FIG. 9: shows a cumulative relative variance of the CAESAR dataset explained as a function of the number of shape coefficients. For SMPL the variance is in vertex locations, while for BlendSCAPE it is in triangle deformations.

FIG. 9 shows the relative cumulative variance of SMPL and BlendSCAPE. While SMPL requires many fewer PCs to account for the same percentage of overall variance, the variance is different in the two cases: one is variance in vertex locations and the other is variance in triangle deformations. Explained variance in deformations does not directly translate into explained variance in vertex locations. While this makes the two models difficult to compare precisely, triangle deformations have many more degrees of freedom and it is likely that there are many deformations that produce visually similar shapes. A model requiring fewer components is generally preferable.

Pose parameters $\vec{\theta}_j$ in Eq. (14) are first initialized by minimizing the difference between the model and the registration edges, similar to Eq. (15) using an average template shape. Then $\{\hat{T}^P,\hat{J}^P,W,P,\Theta\}$ are estimated in an alternating manner to minimize Eq. 14. We proceed to estimate J from $\{\hat{J}^P,\hat{T}^P\}$. We then run PCA on pose normalized subjects $\{\hat{T}_j^S\}_{j=1}^{S_{subj}}$ to obtain $\{T,S\}$. The final model is defined by $\{J,W,P,T,S\}$. Note that all training parameters except for $\{T, S\}$ are found with gradient-based dogleg minimization [Nocedal and Wright 2006]. Gradients are computed with automatic differentiation using the Chumpy framework [Loper and Black 2014].

Evaluation

Figure 10:
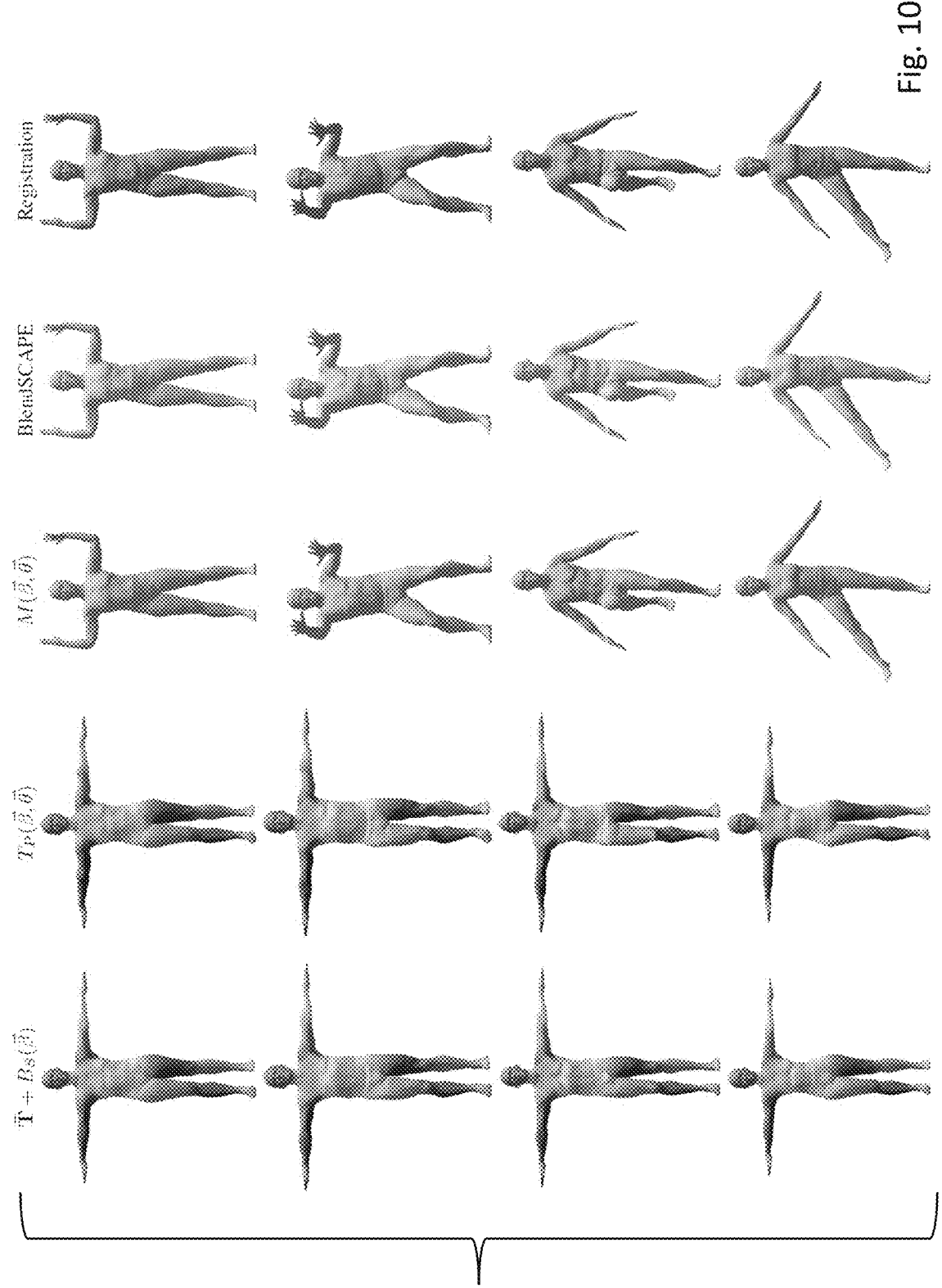
FIG. 10: shows a model fitting with intermediate stages. We fit both BlendSCAPE (blue) and SMPL-LBS, $M(\vec{\beta}, \vec{\theta})$, (red) to registered meshes by optimizing pose and shape. $T+B_s(\vec{\beta})$ shows the estimated body shape and $T_P(\vec{\beta}, \vec{\theta})$ shows the effects of pose-dependent blend shapes. Here we show SMPL-LBS, because TP shows more variation due to pose than SMPL-DQBS.

Two types of error are evaluated. Model generalization is the ability of the model to fit to meshes of new people and poses; this tests both shape and pose blend shapes. Pose generalization is the ability to generalize a shape of an individual to new poses of the same person; this primarily tests how well pose blend shapes correct skinning artifacts and pose-dependent deformations. Both are measured by mean absolute vertex-to-vertex distance between the model and test registrations. For this evaluation we use 120 registered meshes of four women and two men from the public Dyna dataset [Dyn 2015]. These meshes contain a variety of body shapes and poses. All meshes are in alignment with our template and none were used to train our models. FIG. 10 (gray) shows four examples of these registered meshes.

SMPL-LBS and SMPL-DQBS are evaluated and compared with a BlendSCAPE model [Hirshberg et al. 2012] trained from exactly the same data as the SMPL models. The kinematic tree structure for SMPL and the BlendSCAPE model are the same: therefore the same number of pose parameters is used. The models are also compared using the same number of shape parameters.

To measure model generalization each model is first fit to each registered mesh, optimizing over shape $\vec{\beta}$ and pose $\vec{\theta}$ to find the best fit in terms of squared vertex distances. FIG. 10 shows fits of the SMPL-LBS (red) and BlendSCAPE (blue) models to the registered meshes. Both do a good job of fitting the data. The figure also shows how the model works. Illustrated are the estimated body shape, $T+B_S(\vec{\beta})$ and the effect of applying the pose blend shapes, $T_P(\vec{\beta}, \vec{\theta})$.

For pose generalization, for each individual, one of the estimated body shapes from the generalization task is selected, and then the pose, $\vec{\theta}$ is optimal for each of the other meshes of that subject, keeping the body shape fixed. The assumption behind pose generalization is that, if a model is properly decomposed into pose and shape, then the model should be able to fit the same subject in a different pose, without readjusting shape parameters. The pose blend shapes are trained to fit observed registrations. As such, they correct for problems of blend skinning and try to capture pose-dependent deformations. Since the pose blend shapes are not dependent on body shape, they capture something about the average deformations in the training set.

Figure 11:
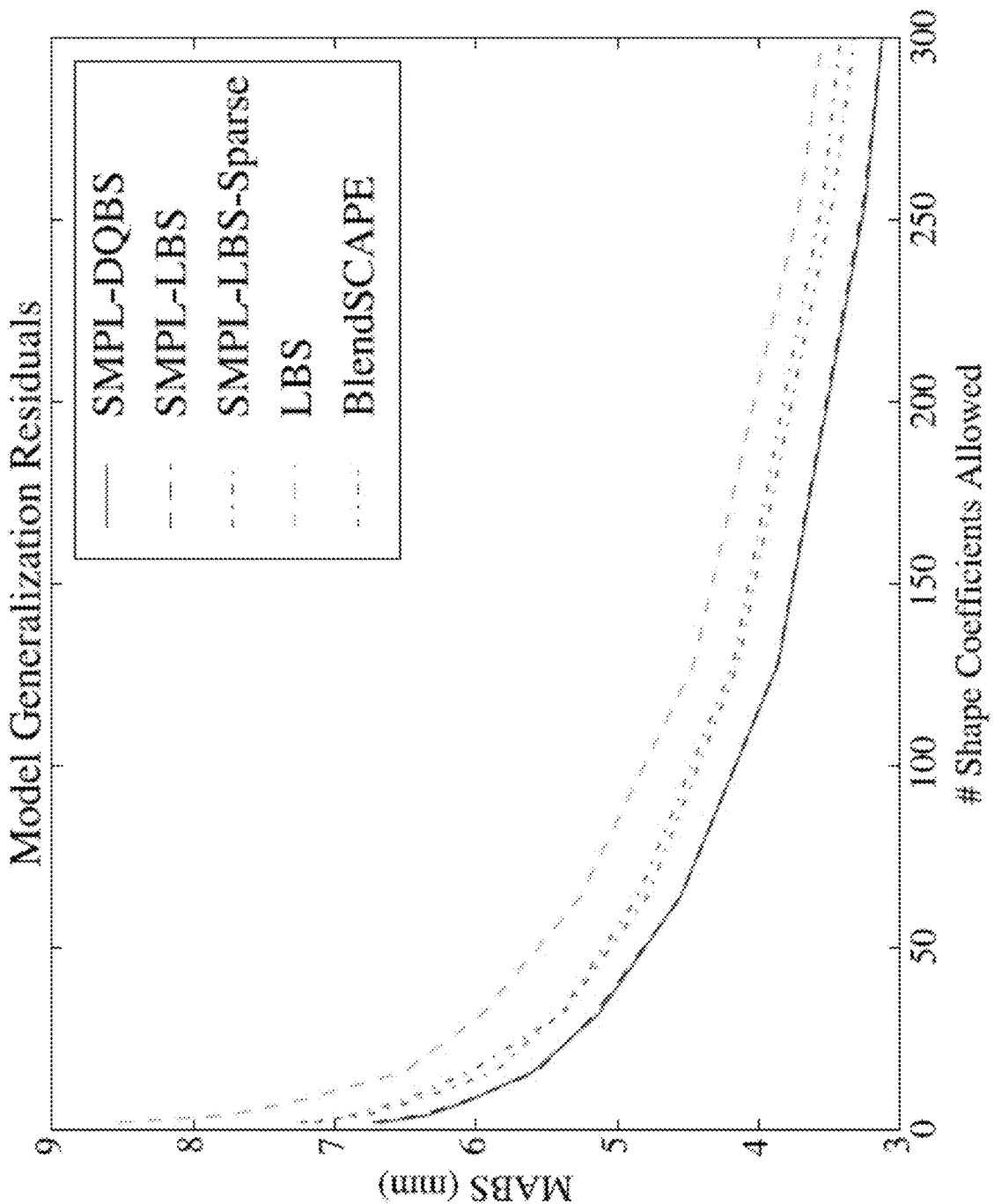
FIG. 11: Model generalization indicates how well one can fit an independent registration. Mean absolute vertex error versus the number of shape coefficients used.
Figure 12:
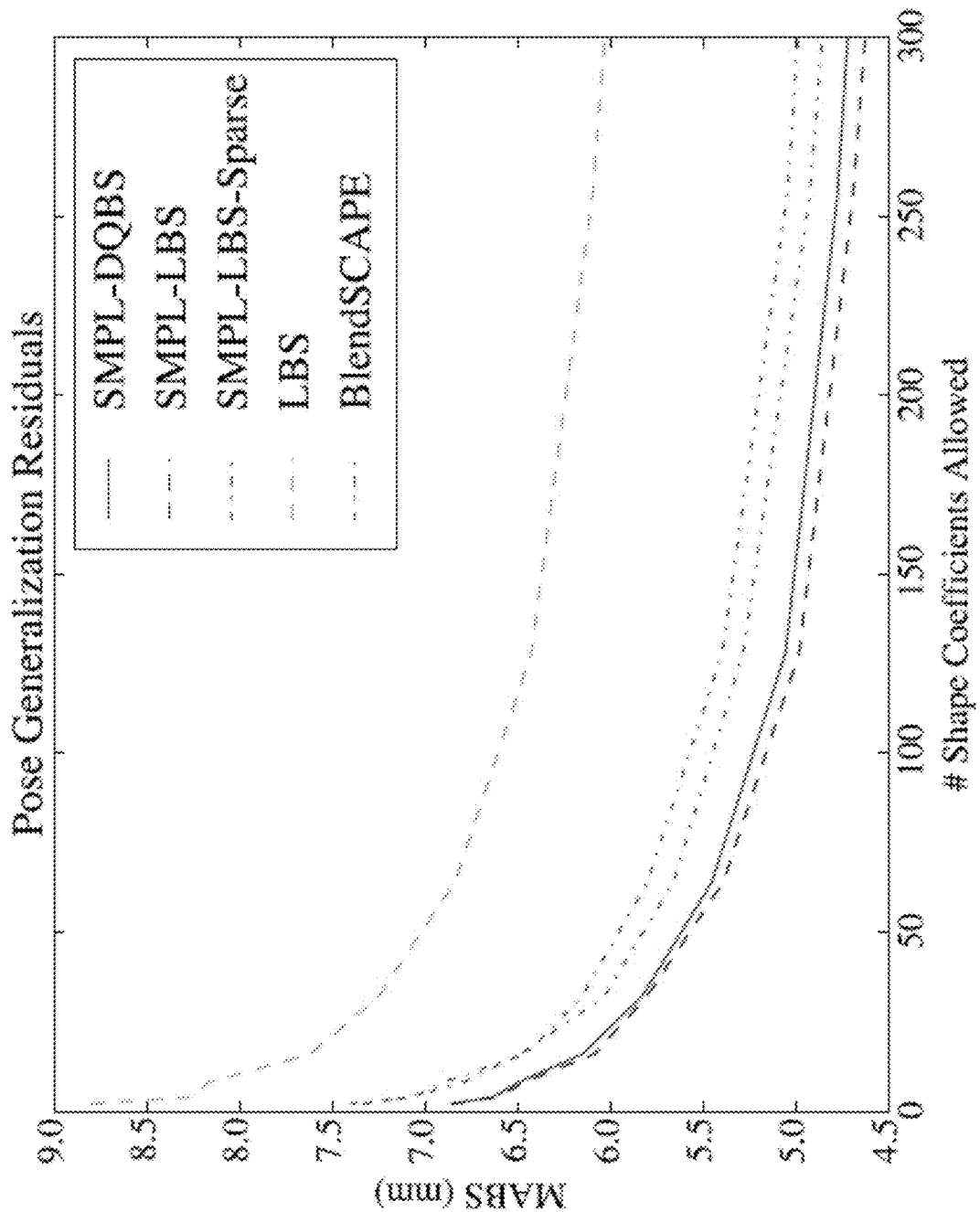
FIG. 12: Pose generalization error indicates how well a fitted shape generalizes to new poses.

FIGS. 11 and 12 show the error of the SMPL models and BlendSCAPE as a function of the number of body shape coefficients used. The differences between SMPL and BlendSCAPE are small (on the order of 0.5 mm) but SMPL is more accurate on average. Remarkably, SMPL-LBS and SMPL-DQBS are essentially identical in model generalization and SMPL-LBS is actually slightly better at pose generalization. This is surprising because the pose blend shapes have much more to correct with LBS. Possibly the simplicity of LBS helps with generalization to new poses.

This analysis is important because it says that users can choose the simpler and faster LBS model over the DQBS model.

The plots also show how well standard LBS fits the test data. This corresponds to the SMPL-LBS model with no pose blend shapes. Not surprisingly, LBS produces much higher error than either BlendSCAPE or SMPL. LBS is not as bad in FIG. 11 because here the model can vary body shape parameters, effectively using changes in identity to try to explain deformations due to pose. FIG. 12 uses a fixed body shape and consequently illustrates how LBS does not model pose-dependent deformations realistically. Note that here one does not retrain a model specifically for LBS and expect such a model would be marginally more accurate.

The pose blend shapes in SMPL are not sparse in the sense that a rotation of a part can influence any vertex of the mesh. With sufficient training data sparsity may emerge from data; e.g. the shoulder corrections will not be influenced by ankle motions. To make hand animation more intuitive, and to regularize the model to prevent long-range influences of joints, one can manually enforce sparsity. To this end, one may train a sparse version of SMPL by using the same sparsity pattern used for blend weights. In particular, a vertex deviation is allowed to be influenced by at most 4 joints. Since every joint corresponds to a rotation matrix, the pose blend shape corresponding to any given vertex will be driven by 9×4 numbers as opposed to 9×23.

This model is referred to as SMPL-LBS-Sparse in FIGS. 11 and 12. It is consistently less accurate than the regular SMPL-LBS model but may still be useful to animators. This suggests that SMPL-LBS is not overfit to the training data and that sparseness reduces the capacity of the model. The sparse model sometimes produces slight discontinuities at boundaries were vertices are influenced by different joint angles. Other strategies to enforce sparsity could be adopted, such as using an $L_1$ prior or enforcing smoothness in the pose blend shapes. These approaches, however, complicate the training process.

Figure 13:
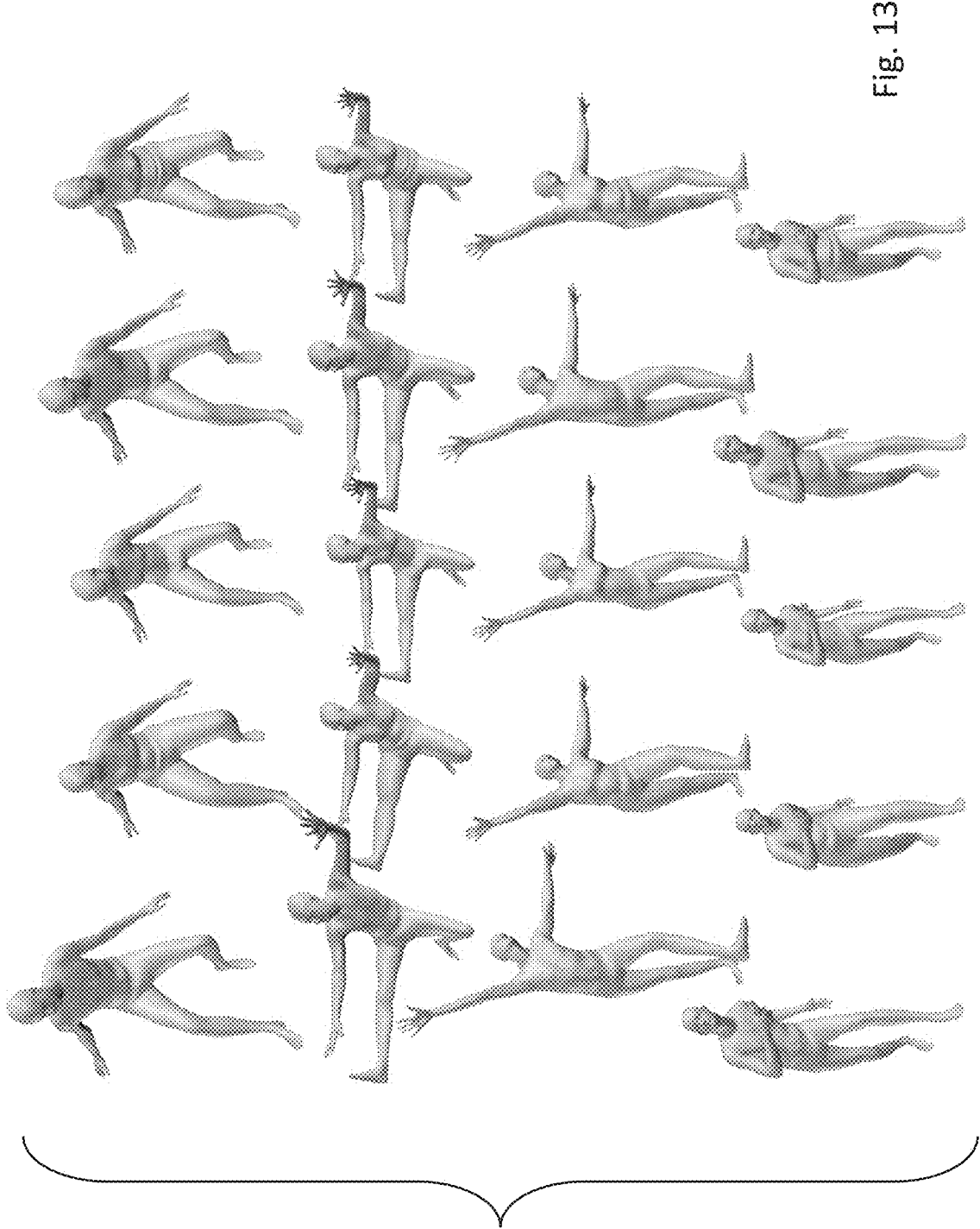
FIG. 13: shows animating SMPL. Decomposition of SMPL parameters into pose and shape: Shape parameters, $\vec{\beta}$, vary across different subjects from left to right, while pose parameters, $\vec{\theta}$ vary from top to bottom for each subject.

FIG. 13 illustrates the decomposition of shape parameters $\vec{\beta}$ and pose parameters $\vec{\theta}$ in SMPL. Pose is held constant from left to right across each row while varying the shape. Similarly, the shape of each person is held constant while varying the pose from top to bottom in each column. The bodies are reposed using poses from the CMU mocap database [CMU 2000]. The pose-dependent deformations look natural through a wide range of poses, despite very different body shapes. This illustrates that the joint regression works well and that the blend shapes are general.

Figure 14:
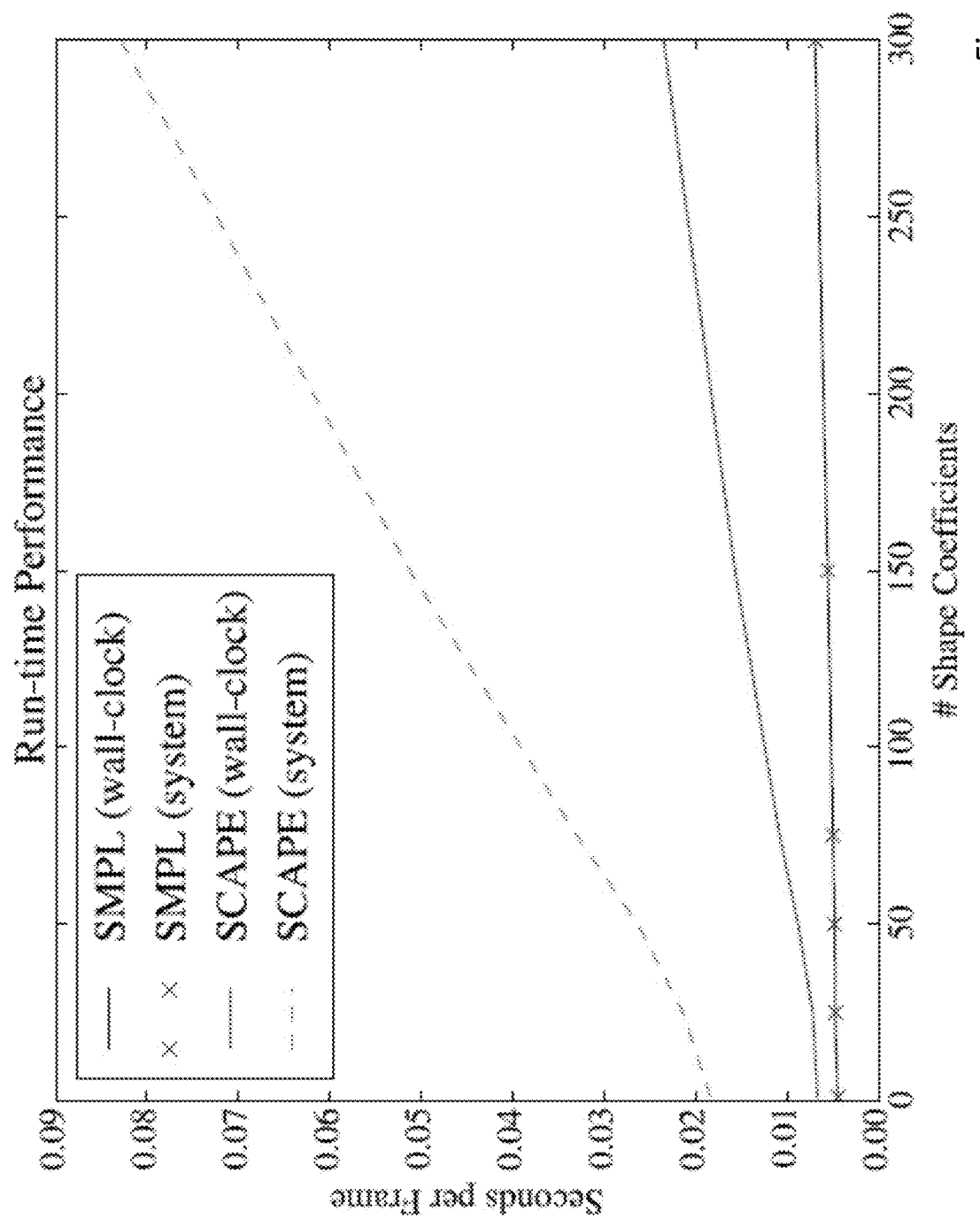
FIG. 14: shows how performance of SMPL and Blend-SCAPE vary with the number of body shape coefficients used. Performance shown here is from a 2014 Macbook Pro.

The run-time cost of SMPL is dominated by skinning and blend-shape multiplication. Performance of a CPU based implementation of the invention model, and a comparison against BlendSCAPE, is shown in FIG. 14. The plot shows the time needed to generate the vertices. The BlendSCAPE rendering makes use of multiple cores, while the SMPL rendering does not; this is why the system time for Blend-SCAPE is higher than the wall-clock time. Shown is the cost of changing body shape. For most applications, this is done once and the shape is then held fixed. The cost of animating the mesh then comes from only the pose blend shapes; this cost corresponds to 0 shape coefficients.

For meshes with the same number of vertices, SCAPE will always be slower. In SMPL each blend shape is of size 3 N, requiring that many multiplications per shape. SCAPE uses triangle deformations with 9 elements per triangle and there are roughly twice as many triangles as vertices. This results in roughly a factor of 6 difference between SMPL and SCAPE in terms of basic multiplications.

Compatibility with Rendering Engines

Because SMPL is built on standard skinning, it is compatible with existing 3D animation software. In particular, for a given body shape, one may generate the subject-specific rest-pose template mesh and skeleton (estimated joint locations) and export SMPL as a rigged model with pose blend shapes in Autodesk's Filmbox (FBX) file format, giving cross-platform compatibility. The model loads as a typical rigged mesh and can be animated as usual in standard 3D animation software.

Pose blend weights can be precomputed, baked into the model, and exported as an animated FBX file. This kind of file can be loaded into animation packages and played directly. The animated FBX files were tested in Maya, Unity, and Blender.

Pose blend weights can also be computed on the fly given the pose, $\vec{\theta}_t$, at time t. To enable this, scripts may be provided that take the joint angles and compute the pose blend weights. Loading and animating SMPL was tested in Maya 2013, 2014 and 2015. The animator can animate the model using any of the conventional animation methods typically used in Maya. The pose blend shape values can be viewed and/or edited manually within Maya if desired. SMPL was also tested in Unity. In SMPL, the blend weights range from −1 to +1 while in Unity they range from 0 to 1. Consequently, the weights are scaled and recentered for compatibility. For Unity, each blend shapes can be split into two—one positive and one negative. If the SMPL blend shape should be positive, then a script tells unity that the negative blend shape has zero weight (and vice versa for negative values). To speed computation for real-time graphics, blend shape weights that are close to zero can be set to zero and not used.

DMPL: Dynamic SMPL

While SMPL models static soft-tissue deformations with pose it does not model dynamic deformations that occur due to body movement and impact forces with the ground. Given 4D registrations that contain soft-tissue dynamics, we fit them by optimizing only the pose of a SMPL model with a personalized template shape. Displacements between SMPL and the observed meshes correspond to dynamic soft-tissue motions. To model these, a further embodiment of the invention introduces a new set of additive blend shapes called dynamic blend shapes. These additional displacements are correlated with velocities and accelerations of the body and limbs rather than with pose.

Let $\vec{\phi}_t=[\vec{\theta}_t, \vec{\theta}_t, v_t, a_t, \vec{\delta}_{t-1}, \vec{\delta}_{t-2}]$ denote the dynamic control vector at time t. It is composed of pose velocities and accelerations $\vec{\theta}_t, \vec{\theta}_t \in \Re^{|\theta|}$, root joint velocities and accelerations $v_t, a_t \in \Re^3$ and a history of two vectors of predicted dynamic coefficients $\vec{\delta}_{t-1}, \vec{\delta}_{t-2} \in \Re^{|\delta|}$, describes below.

Figure 15:
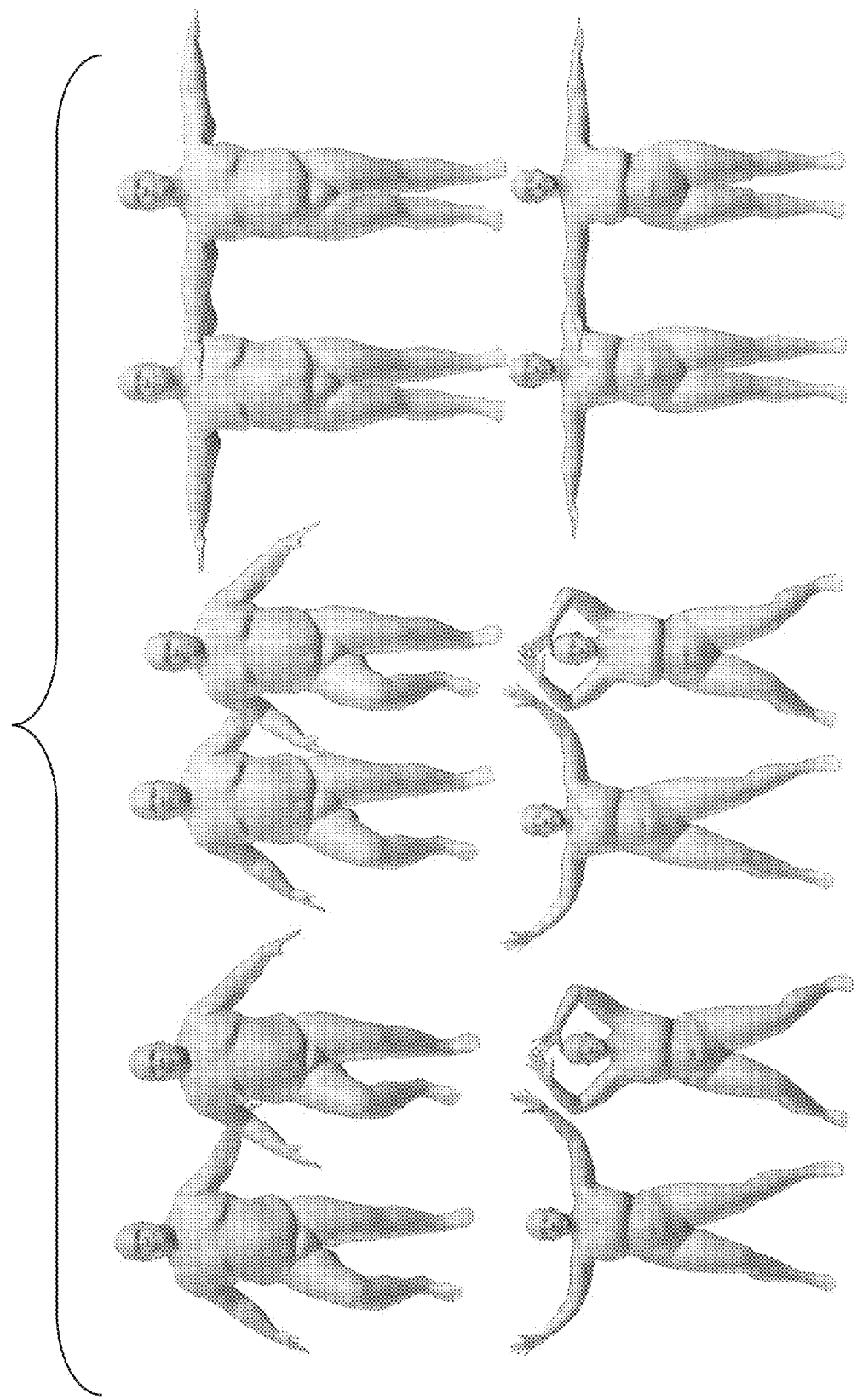
FIG. 15: shows DMPL model of soft-tissue motion according to an embodiment of the invention. Above, two frames of a "running" sequence of a male subject from the Dyna dataset, below two frames of a jumping jacks sequence of a female subject from the Dyna dataset. From left to right: SMPL, DMPL, and the dynamic blend shapes added to the base body shape. While SMPL models deformations due to pose well it does not model dynamic deformations. DMPL predicts dynamic deformations from motion and body shape, resulting in more lifelike animations.

The previous linear formulation is extended by adding the dynamic blend shape function, $B_D(\vec{\phi}_t, \vec{\beta})$, to the other blend shapes in the rest pose before applying the skinning function. The shape in the zero pose becomes $$T_D(\vec{\beta}, \vec{\theta}_t, \vec{\phi}_t) = T + B_S(\vec{\beta}) + B_P(\vec{\theta}_t) + B_D(\vec{\phi}_t, \vec{\beta}) \quad (16)$$

as illustrated in FIG. 15. Here, $B_D(\vec{\phi}_t, \vec{\beta})$ takes as input the dynamic control vector at time t, and shape coefficients $\vec{\beta}$, and predicts vertex offsets in the rest pose.

Whereas in [Pons-Moll et al. 2015] dynamic deformations are modeled using triangle deformations, DMPL models deformations in vertex space. The method according to the present embodiment of the invention build male and female models using roughly 40,000 registered male and female meshes from [Dyn 2015]. The pose in each frame and the displacements between SMPL and the registration are computed. Using PCA, one obtains a mean and the dynamic blend shapes, $\mu_D \in \Re^{3N}$ and $D \in \Re^{3N \times |\delta|}$ respectively. We take $|\vec{\delta}|=300$ principal components as in Dyna. Dynamic deformations vary significantly between subjects based on their body shape and fat distribution. To capture this, we train a model that depends on the body shape parameters $\vec{\beta}$ as in Dyna.

Dynamic blend shapes are then predicted using $$B_D(\vec{\phi}_t, \vec{\beta}; D) = \mu_D + Df(\vec{\phi}_t, \vec{\beta}) \quad (17)$$

analogous to Eq. (22) in [Pons-Moll et al. 2015] where $f(\cdot)$ is a function that takes as input a dynamic control vector, $\vec{\phi}_t$, and predicts the vector of dynamic shape coefficients, $\vec{\delta}_t$. This formulation of soft-tissue displacements in terms of dynamic blend shapes means that, unlike Dyna, this inventive model remains compatible with current graphics software. To animate the model, one only needs a script to compute the coefficients, $\vec{\delta}_t = f(\vec{\phi}_t, \vec{\beta})$, from the pose sequence and body shape. The DMPL model produces soft-tissue dynamics that appear more realistic than those of Dyna.

According to a further embodiment of the invention, the above-described methods and models can also be employed in learning and tracking a 3D body shape of freely moving infants from RGB-D sequences. However, most statistical models are learned from high quality scans, which are expensive, and demand cooperative subjects willing to follow instructions. There is no repository of high quality infant 3D body scans from which one could learn the statistics of infant body shape. there is no infant body model. While parametric body models like the above-described SMPL cover a wide variety of adult body shapes, the shape space does not generalize to the domain of infant bodies.

Learning an infant shape space is therefore a chicken-and-egg problem: a model is needed to register the data, and registrations are needed to learn a model. In addition, acquiring infant shape data is not straightforward, as one needs to comply with strict ethics rules as well as an adequate environment for the infants. Infant RGB-D data poses several challenges in terms of incomplete data, i.e. partial views, where large parts of the body are occluded most of the time. The data is of low quality and noisy; captured subjects are not able to follow instructions and take predefined poses.

Figure 17:
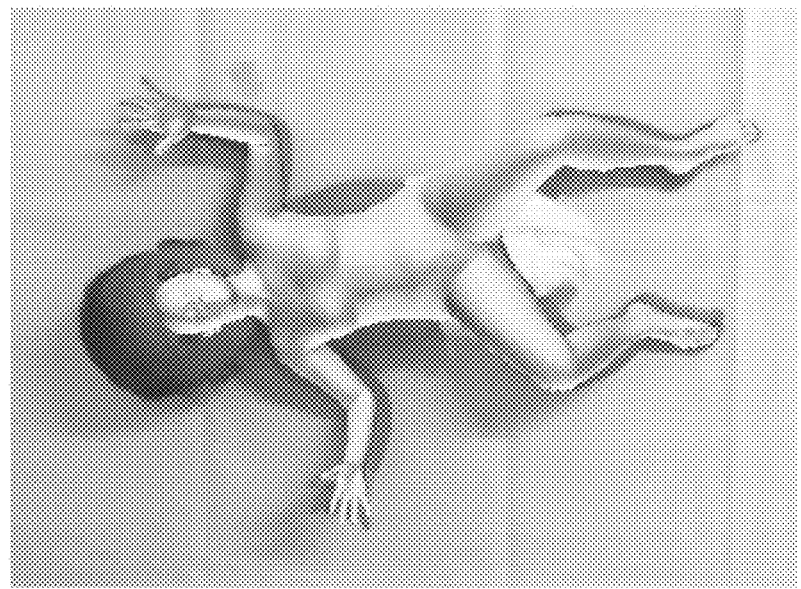
FIG. 17: shows an overlay of a scaled SMPL body model over the image of an infant.

FIG. 17 shows an overlay of a scaled SMPL body model over the image of an infant, demonstrating that scaling the adult model to infant size does not provide satisfactory results, as body proportions severely differ.

According to the invention, an initial infant model, SMPLB may be created by adapting the SMPL model presented above and registering it to the preprocessed data. Then, a Skinned Multi-Infant Linear model (SMIL) is learned from these registrations. More particularly, an initial model SMPLB is first created based on the above-described SMPL model, a statistical body model learned from thousands of adult 3D scans. According to the invention, (i) the SMPL mean shape is replaced with an infant body mesh created with MakeHuman [10], (ii) the SMPL shape space is left untouched, (iii) the pose blendshapes are scaled to infant size, and (iv) the pose priors are manually adjusted. Because pose priors were learned on standing adults and not lying infants, adjusting these manually is important to prevent the model from explaining shape deformations with pose parameters.

Figure 18:
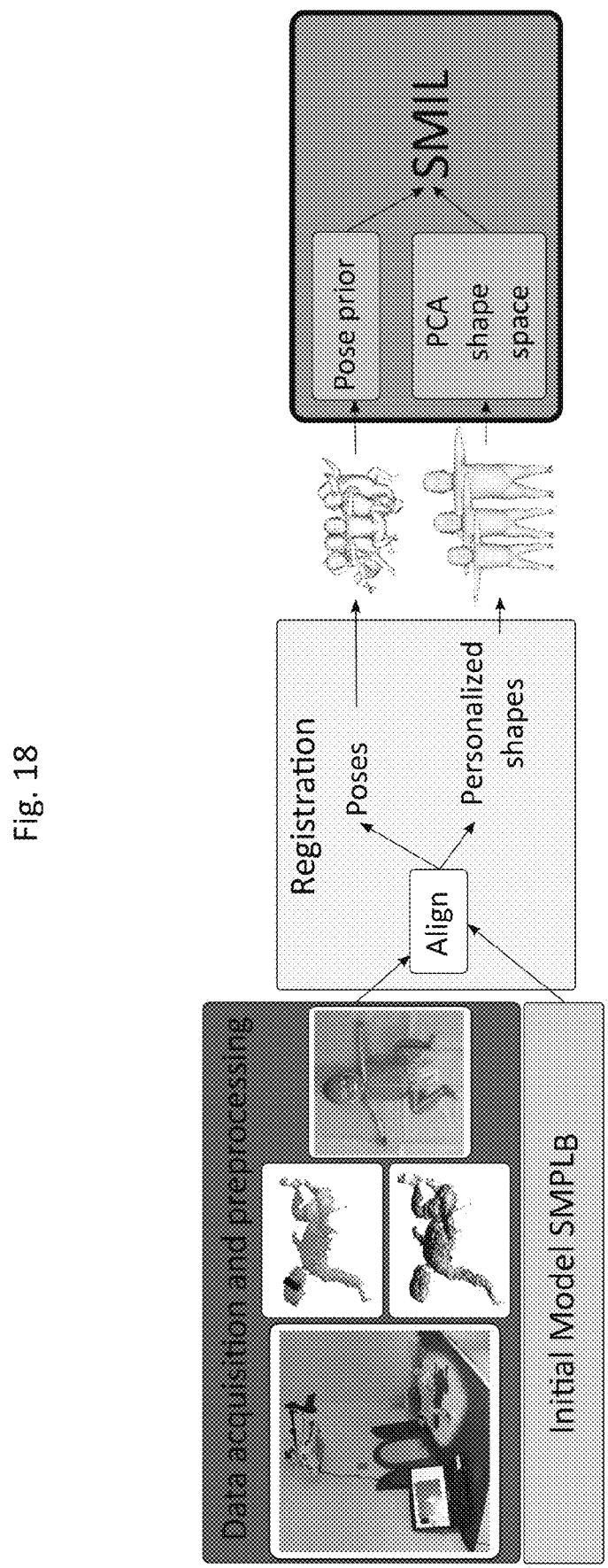
FIG. 18: shows an overview of a method for learning an infant body according to an embodiment of the invention.
Figure 19B:
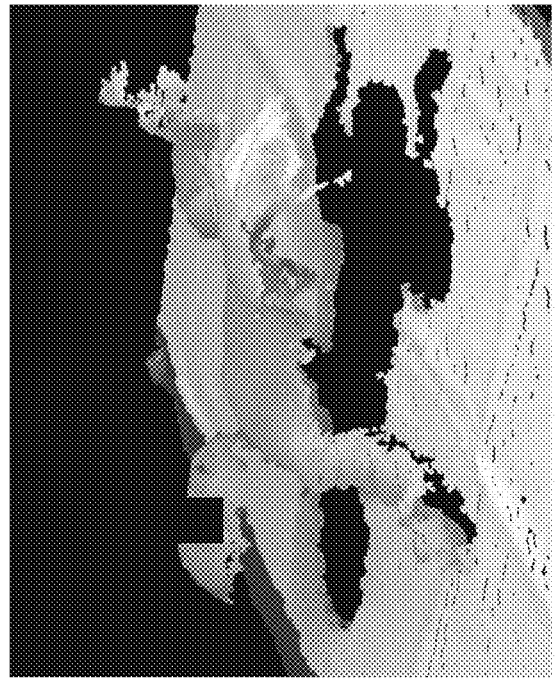
FIGS. 19A-19D: shows a sample of the preprocessing steps 2D pose estimation (a), background removal (b and c), and clothing segmentation (d) according to an embodiment of the invention.
Figure 19A:
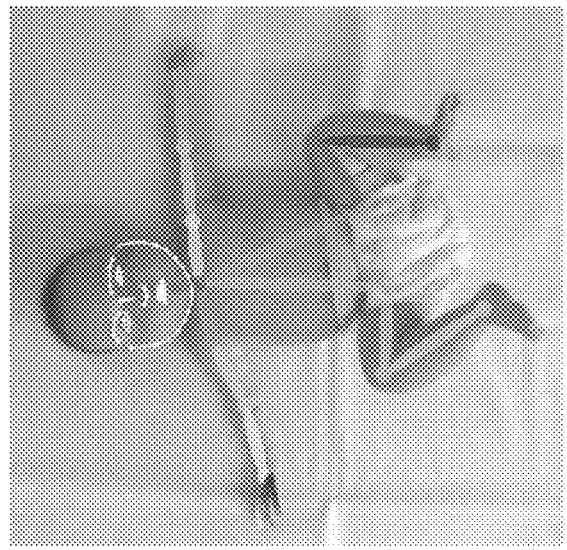
Figure 19D:
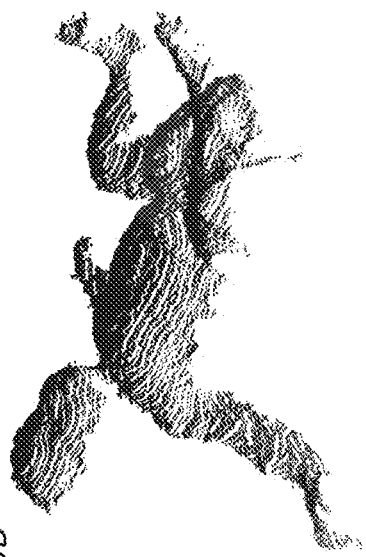
Figure 19C:
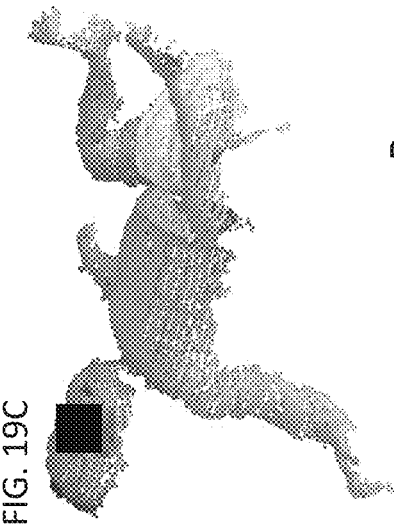

FIG. 18 shows a Skinned Multi-Infant Linear (SMIL) model creation pipeline according to an embodiment of the invention. An initial infant model is created based on SMPL. Background and clothing segmentation of the recorded sequences is performed in a preprocessing step, and body, face, and hand landmarks are estimated in RGB images. The initial model, SMPL B, is registered to the RGB-D data, and one personalized shape is created for each sequence, capturing infant shape details outside the SMPL shape space. A new infant specific shape space is learned by performing PCA on all personalized shapes, with the mean shape forming our base template. Also, a prior is learned over plausible poses from a sampled subset of all poses.

For data acquisition, freely moving infants were recorded for 3 to 5 minutes on the examination table without external stimulation, using a Microsoft Kinect $V_1$ RGB-D camera. Ethics approval was obtained from Ludwig Maximilian University Munich (LMU) and all parents gave written informed consent for participation in this study.

In a preprocessing step, the depth images are transformed to 3D point clouds using the camera calibration. To segment the infant from the scene, a plane is fit to the background table of the 3D point cloud using RANSAC, all points close to or below the table plane are removed and a simple cluster-based filtering is applied. Further processing steps operate on this segmented cloud, in which only points belonging to the infant remain. Plane-based segmentation is not always perfect, e.g. in case of a wrinkled towel very close to the infant body, some noise may remain. However, the registration methods have proven to be robust to outliers of this kind. The estimated table plane will be reused for constraining the infants' backs in the registration stage.

In order to avoid modeling diapers and clothing wrinkles in the infant shape space, the input point clouds are automatically segmented into clothing and skin using the color information. After registering the initial model to one scan, an unsupervised k-means clustering is performed to obtain the dominant modes in RGB. The clothing type are manually defined to be: naked, diaper, onesie long, onesie short or tights. This determines the number of modes and the cloth prior. The dominant modes are used to define probabilities for each 3D point being labeled as cloth or skin. The points' probabilities are transferred to the model vertices, and a minimization problem on a Markov random field defined by the model topology is solved. The result of the model vertices is transferred to the original point cloud, and a clean segmentation of the points belonging to clothing (or diaper) and the ones belonging to the skin is obtained.

An example of the segmentation result is shown in the data acquisition and preprocessing box of FIG. 18; blue is skin and red is diaper. To avoid registering all scans twice, i.e. a first rough registration to segment the sequence and a second to obtain the final registration, the clothing labels are transferred from the registration at frame t−1 to a corresponding point at frame t. In practice this works well, since body changes in consecutive frames are relatively small.

Scanning of adults typically relies on them striking a simple pose to facilitate model fitting and registrations. The scanned infants cannot take a predefined pose to facilitate an initial estimate of model parameters. However, existing approaches on 2D pose estimation from RGB images (for adults) have achieved impressive results. Most interestingly, experiments show that applying these methods to images of infants produces accurate estimates of 2D pose. In order to choose a "good" candidate frame to initialize the model parameters (see Sec. 3.5), the 2D body landmarks are leveraged together with their confidence values. From the RGB images body pose as well as face and hand landmarks are extracted. The inventors experimentally verified that they provide key information on the head and hand rotations to the registration process, which is complementary to the noisy point clouds.

As an alternative to defining the number of clothing parts for each sequence (preprocessing) manually, a classifier predicting the clothing type from RGB images, e.g. a neural network trained to this purpose, may also be used to make the above steps fully automatic.

FIGS. 19A-19D show a sample of the preprocessing steps 2D pose estimation (a), background removal (b and c), and clothing segmentation (d) according to an embodiment of the invention. In a preprocessing step, depth images are (i) transformed to 3D point clouds using the camera calibration, (ii) all table points are filtered not belonging to the infant by fitting a plane to the examination table, (iii) the infant point cloud is segmented into skin, diaper and onesie. Finally, (iv) landmarks are extracted from the RGB images, which provides 2D pose, hand locations and facial landmarks, with their respective confidence estimates.

An initial model is manually created by adapting the Skinned Multi-Person Linear model (SMPL) described above. More particularly, an initial infant mesh is manually created using makeHuman, an open source software for creating 3D characters. Making use of the fact that meshes exported from makeHuman share the same topology, independent of shape parameters, SMPL is registered to an adult makeHuman mesh, and makeHuman vertices are described as linear combinations of SMPL vertices. This allows applying this mapping to the infant mesh and transferring it to the SMPL topology. The SMPL base adult-shape template is then replaced with the registered infant mesh. The SMPL pose blend shapes, which correct skinning artifacts and pose-dependent shape deformations, are further scaled to infant size. Specifically, infant height are divided by average adult height and the blend shapes are multiplied by this factor. The SMPL joint regressor is kept untouched, as it worked well for infants in experiments. As SMPL pose priors, i.e. prior probabilities of plausible poses, are learned from data of adults in upright positions, these cannot be directly transferred to lying infants. They are manually adjusted experimentally. Specifically, bending of the spine was penalized, since the infants are lying on their backs. Without this penalty, the model tries to explain shape deformations with pose parameters.

We register the initial model to the segmented point cloud using gradient-based optimization w.r.t. shape $\beta$ and pose $\theta$ parameters.

More particularly, the registrations to the preprocessed 3D point clouds of initial model are computed by minimizing the energy $$E(\beta,\theta)=E_{data}+E_{lm}+E_{sm}+E_{sc}+E_{table}+E_{\beta}+E_{\theta} \tag{18}$$

where the weight factors $\lambda_x$ associated with term $E_x$ are omitted for compactness.

The term $E_{data}$ measures the scan to registration mesh distance, $E_{lm}$ penalizes the distance between estimated and registration landmarks projected to 2D, $E_{sm}$ enforces temporal pose smoothness and $E_{sc}$ penalizes model self-intersections. $E_{table}$ integrates background information in order to keep the bottom side of the registration body close to, but not inside the table. $E_\beta$ and $E_\theta$ are the shape and pose prior that enforce the shape parameters to be close to the mean, and help to prevent unnatural poses, respectively. The scan points are designated by P. P is segmented into the scan points belonging to the skin ($P_{skin}$) and the ones belonging to the onesie or the diaper ($P_{cloth}$).

The data term $E_{data}$ consists of two different terms:

$$E_{data}=E_{s2m}+\lambda_{m2s}E_{m2s}. \tag{19}$$

$E_{s2m}$ accounts for the distance of the scan points to the model mesh and $E_{m2s}$ accounts for the distance of the visible model points to the scan points.

$$E_{m2s}(M, P) = \sum_{m_i \in vis(M)} \rho\left(\min_{v \in P}\|(m_i, v)\|\right) \tag{20}$$

where M denotes the model surface and $\rho$ is the robust GemanMcClure function. The scan points are denoted by P. In the preprocessing stage, P is segmented into the scan points belonging to the skin ($P_{skin}$) and the ones belonging to clothing ($P_{cloth}$). The function vis(M) selects the visible model vertices. The visibility is computed using the Kinect $V_1$ camera calibration and the OpenDR renderer.

$E_{s2m}$ consists also of two terms, $$E_{s2m}=\lambda_{skin}E_{skin}+\lambda_{cloth}E_{cloth}. \tag{21}$$

$E_{skin}$ enforces the skin points to be close to the model mesh and $E_{cloth}$ enforces the cloth points to be outside the model mesh. The skin term can be written as $$E_{skin}(M, P_{skin}, W) = \sum_{v_i \in P_{skin}} W_i p(dist(v_i, M)), \quad (22)$$

where W are the skin weights.

The cloth term is divided into two more terms, depending on cloth points lying inside or outside the model mesh:

$$E_{cloth} = E_{outside} + E_{inside} \text{ with} \quad (23)$$

$$E_{outside}(M, P_{cloth}, W) = \sum_{v_i \in P_{skin}} \delta_i^{out} W_i dist(v_i, M)^2, \quad (24)$$

where $\delta_i^{out}$ is an indicator function, returning 1 if $v_i$ lies outside the model mesh, else 0, and $$E_{inside}(M, P_{cloth}, W) = \sum_{v_i \in P_{skin}} \delta_i^{in} W_i p(dist(v_i, M)), \quad (25)$$

with $\delta_i^{in}$ an indicator function, returning 1 if $v_i$ lies inside the model mesh, else 0.

The landmark term $E_{lm}$ uses, instead of skeleton joints, estimated 2D face landmarks (nose, eyes outlines and mouth outline) as well as hand landmarks (knuckles). Of the estimated body pos, only eye and ear landmarks are used in this term, which help for correcting head rotation for extreme profile faces where facial landmark estimation fails. L designates the set of all markers.

Hand landmarks are used for aligning coarse hand rotation, since the sensor accuracy does not allow fitting finger details. The estimated body joints positions are only used for initialization.

The 3D model points corresponding to the above landmarks were manually selected through visual inspection. They are projected into the image domain using the camera calibration in order to compute the final 2D distances.

The landmark term is then $$E_{lm} = \lambda_{lm} \sum_{l \in L} c_l p(l_M - l_{est}), \quad (26)$$

where $c_l$ denotes the confidence of an estimated landmark 2D location $l_{est}$, and $l_M$ is the model landmark location projected in 2D using the camera calibration.

The recorded infants are too young to roll over, which is why the back is rarely seen by the camera. However, the table on which the infants lie, allows to infer shape information of the back. It is assumed that the body cannot be inside the table, and that a large part of the back will be in contact with it.

Π denotes the table plane. The table energy has two terms: $E_{in}$ prevents the model vertices M from lying inside the table (i.e. behind the estimated table plane), by applying a quadratic error term on points lying inside the table. $E_{close}$ acts as a gravity term, by pulling the model vertices M, which are close to the table towards the table, by applying a robust GemanMcClure penalty function to the model points that are close to the table.

The table energy term is written as $$E_{table} = \lambda_{in} E_{in} + \lambda_{close} E_{close}, \text{ with} \quad (27)$$

$$E_{in}(M) = \sum_{x_i \in M} \delta_i^{in}(x_i) dist(x_i, \Pi)^2, \text{ and} \quad (28)$$

$$E_{close}(M) = \sum_{x_i \in M} \delta_i^{close}(x_i) p(dist(x_i, \Pi)), \quad (29)$$

where $\delta_i^{in}$ is an indicator function, returning 1 if $x_i$ lies inside the table (behind the estimated table plane), or 0 otherwise. $\delta_i^{close}$ is an indicator function, returning 1 if $x_i$ is close to the table (dist less than 3 cm) and faces away from the camera, or 0 otherwise.

To account for soft tissue deformations of the back, which SMIL does not model, the model is allowed to virtually penetrate the table by translating the table plane by 0.5 cm, i.e. by pushing the virtual table back. The weight of the table term needs to be balanced with the data term to avoid a domination of the gravity term, keeping the body in contact with the table while the data term suggests otherwise.

Depth data contains noise, especially around the borders. To avoid jitter in the model caused by that noise, a temporal pose smoothness term is added. It avoids important changes in pose unless one of the other terms has strong evidence. The temporal pose smoothness term $E_{sm}$ penalizes large differences between the current pose O and the pose from the last processed frame O'.

The penalty for model self-intersections is denoted by $E_{sc}$ and the shape prior term by $E_\beta$.

The SMIL pose prior consists of mean and covariance learned from 37K sample poses. $E_\theta$ penalizes the squared Mahalanobis distance between θ and the pose prior.

To compute the registrations of a sequence, an initial shape is computed using 5 frames. In this first step, one only optimizes for the shape parameters β. This shape is kept fixed and used later on as a regularizer. Experiments showed that otherwise the shape excessively deforms in order to explain occlusions in the optimization process.

With the initial shape fixed, the poses for all the frames in the sequence are computed, i.e. by optimizing the following energy w.r.t. pose parameters θ and the global translation t:

$$E(\theta, t) = E_{data} + E_{lm} + E_{sm} + E_{sc} + E_\theta. \quad (30)$$

This energy is equal to Eq. 18 without $E_{table}$ and $E_{beta}$. The computed posed shape at frame f is denoted as $S_f$.

In the last step, the registration meshes $R_f$ are computed and the model vertices $v \in R_f$ are allowed to freely deform to best explain the input data. One optimizes w.r.t. v the energy $$E(v) = E_{data} + E_{lm} + E_{table} + E_{cpl}, \quad (31)$$

where $E_{cpl}$ is a "coupling term" used to keep the registration edges close to the edges of the initial shape.

$$E_{cpl}(R_f, S_f) = \lambda_{cpl} \sum_{e \in V'} \|(AR)_e - (AS)_e\|_F^2, \quad (32)$$

where V' denotes the edges of the model mesh. AR and AS are edge vectors of the triangles of $R_f$ and $S_f$ and e indexes the edges. The results of these optimizations are the final registrations.

All energies are minimized using a gradient-based dogleg minimization method with OpenDR and Chumpy. For each fit, the same energy weights are used for all sequences. For Eq. 18 and Eq. 27 the weight values: $\lambda_{skin}$=800, $\lambda_{cloth}$=300, $\lambda_{m2s}$=400, $\lambda_{lm}$=1, $\lambda_{table}$=10000, $\lambda_{sm}$=800, $\lambda_{sc}$=1, $\lambda_{\beta}$=1 and $\lambda_{\theta}$=0.15 are used.

For Eq. 28 the weight values: $\lambda_{skin}$=1000, $\lambda_{cloth}$=500, $\lambda_{m2s}$=1000, $\lambda_{lm}$=0.03, $\lambda_{table}$=0.03, $\lambda_{table}$=10000 and $\lambda_{cpl}$=1. are used.

Figure 20:
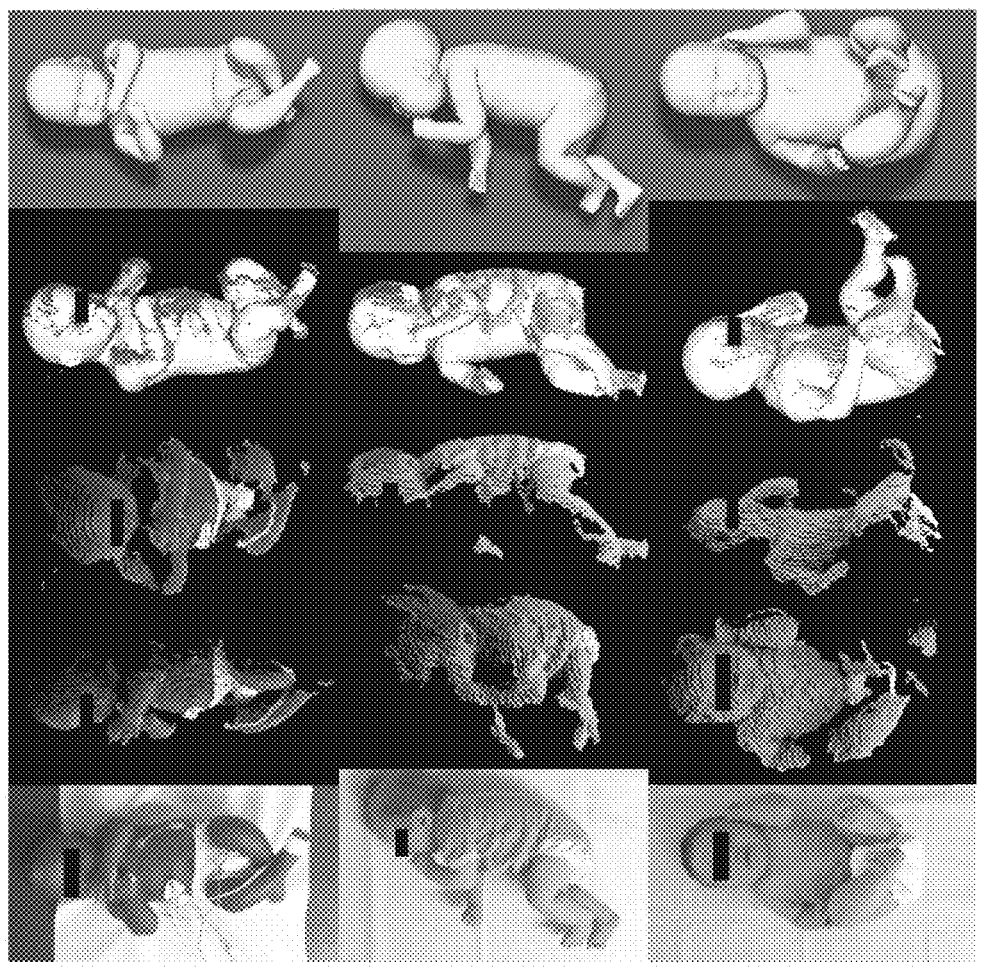
FIG. 20: shows, from left to right, input RGB images, 3D point clouds (identical image, different view and with registered SMIL and the rendered registration (rightmost) for three sample frames.

FIG. 20 shows registration samples for three sample frames. From left to right: input RGB images, 3D point clouds (identical image, different view and with registered SMIL and the rendered registration (rightmost).

Since the optimization problem is highly non-convex, the success of the registration depends on a good initialization. In contrast to adults, infants are incapable of striking poses on demand. Thus, relying on a predefined initial pose is unpractical. According to the invention, this may be overcome by a novel automatic method to select an initialization frame. Assuming that a body segment is most visible if it has maximum 2D length over the sequence, since perspective projection decreases 2D body segment length, the initialization frame is chosen as $$f_{init} = \operatorname{argmax}_f \sum_{s \in S} \operatorname{lens}(s, f) * c(s, f) \quad (33)$$

where S is the set of segments, len(s; f) is the 2D length of the segment s at frame f, and c(s; f) is the estimated confidence of the joints belonging to s at frame f. For $f_{init}$ the initial registration is determined by optimizing a simplified version of Eq. 18:

$$E_{init} = \lambda_{j2d} E_{j2d} + \lambda_{\theta} E_{\theta} + \lambda_a E_a + \lambda_{\beta} E_{\beta} + \lambda_{s2m} E_{s2m} \quad (34)$$

It contains a 2D body pose landmark term similar to $E_{lm}$, a simplified data term, a strong prior on pose, and a shape regularizer. From $f_{init}$, the neighboring frames are sequentially processed (forward and backward in time), using as initialization the shape and pose results of the last processed frame. More particularly, where $E_{j2d}$ is similar to $E_{lm}$ with landmarks being 2D body joint positions. $E_{\theta}$ is a strong pose prior, $E_a(\theta) = \Sigma_i \exp(\theta_i)$ is an angle limit term for knees and elbows and $E_{\beta}$ a shape prior. Its minimum provides a coarse estimation of shape and pose, which is refined afterwards.

In order to determine a personalized shape, for each sequence, the point clouds of a randomly selected subset of 1000 frames are "unposed". The process of unposing changes the pose of the model into a normalized pose, which removes the variance related to body articulation. Because large parts of the infants' backs are never visible, model vertices are added that belong to faces oriented away from the camera, called virtual points. The union of the unposed scan points and the virtual points is the fusion scan. The model is registered to the fusion scan by first optimizing only shape parameters and then optimizing for the free surface to best explain the fusion scan, by coupling the free surface to the first computed shape.

More particularly, the initialization energy $E_{init}$ is used for a coarse estimation of shape and pose, which is refined afterwards. It is $$E_{init} = \lambda_{j2d} E_{j2d} + \lambda_0 E_0 + \lambda_a E_a + \lambda_{\beta} E_{\beta} + \lambda_{s2m} E_{s2m} \quad (33)$$

where $E_{j2d}$ is similar to Elm with landmarks being 2D body joint positions. $E_0$ is a strong pose prior, $E_a(\theta) = \Sigma_i \exp(\theta_i)$ is an angle limit term for knees and elbows and $E_{\beta}$ a shape prior. The self intersection term is omitted. A scan-to-mesh distance term $E_{s2m}$ is added.

Energy weights: $\lambda_{j2d}$=6, $\lambda_0$=10, $\lambda_a$=30, $\lambda_{\beta}$=1000, $\lambda_{s2m}$0=30000, To capture the subject specific shape details, one personalized shape is created from each sequence, which is not restricted to the shape space of the model. A randomly selected subset of 1000 frames per sequence is unposed. The process of unposing changes the model pose to a normalized pose (T-pose) in order to remove variance related to body articulation. For each scan point, the offset normal to the closest model point is calculated. After unposing the model, these offsets are added to create the unposed point cloud for each of the 1000 frames. Since the recorded infants lie on their backs most of the time, the unposed clouds have missing areas on the back side. To take advantage of the table constraint in each frame and sparsely fill the missing areas, virtual points are added, i.e. points from model vertices that belong to faces oriented away from the camera, to the unposed cloud. The clothing segmentation labels are retained for all unposed scan points. The union of all unposed point clouds including virtual points is called the fusion cloud.

To compute the personalized shape, 1 million points are uniformly random sampled from the fusion cloud. In a first stage, $E=E_{data}+E_{\beta}$ is optimized w.r.t. the shape parameters $\beta$, and the pose $\theta$ is kept fixed in the zero pose of the model (T-pose with legs and arms extended). An initial shape estimate is obtained that lies in the original shape space. In a second stage, the model vertices are allowed to deviate from the shape space, but are tied to the shape from the first stage with a coupling term. $E=E_{data}+E_{cpl}$ is optimized w.r.t. the vertices.

Energy weights: $\lambda_{skin}$=100, $\lambda_{cloth}$=100$\lambda_{\beta}$=0.5 and $\lambda_{cpl}$=0.4.

The clothing segmentation is also transformed to the unposed cloud and therefore, the fusion cloud is labeled into clothing and skin parts. These are used in the data term to enforce that the clothing points to lie outside the model.

In order to learn the SMIL shape space and pose prior, the new infant shape space is computed by doing weighted principal component analysis (WPCA) on personalized shapes of all sequences, using the EMPCA algorithm provided in https://github.com/jakevdp/wpca, which computes weighted PCA with an iterative expectation-maximization approach. The first 20 shape components are retained.

The weights used to train the model are: 3 for the scan points labeled as skin ($P_{skin}$)), 1 for the scan points labeled as clothing ($P_{skin}$)), and smooth transition weights for the scan points near the cloth boundaries are computed using skin weights W.

Despite including the clothing segmentation in the creation of personalized shapes, clothing deformations cannot be completely removed and diapers typically tend to produce body shapes with an over-long trunk. The recorded sequences contain infants with longarm onesies, short-arm onesies, tights, diapers and without clothing. These different clothing types cover different parts of the body. As one wants the shape space to be close to the real infant shape without clothing artifacts, low weights are used for clothing points and high weights for skin points in the PCA.

Figure 21B:
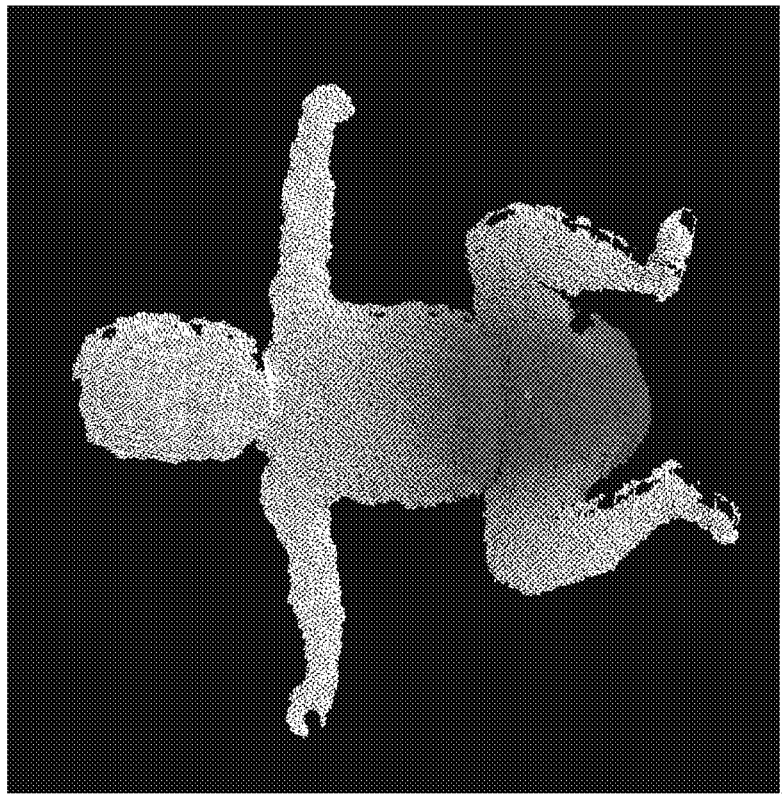
FIGS. 21A-21B: show weights used for the weighted PCA on a sample frame. a) Original RGB image. b) Weights used for weighted PCA. White points have a high weight (value of 3), red point have a low weight (value of 1). The smooth transition is computed using the skin weights W.
Figure 21A:
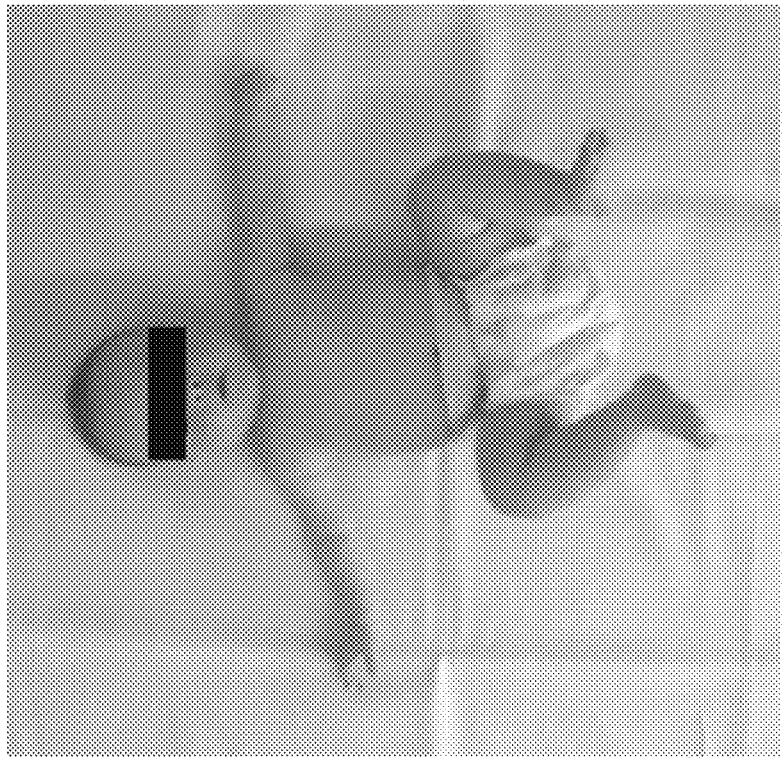

FIGS. 21A-21B shows weights used for the weighted PCA on a sample frame. a) Original RGB image. b) Weights used for weighted PCA. White points have a high weight (value of 3), red point have a low weight (value of 1). The smooth transition is computed using the skin weights W.

Figure 22:
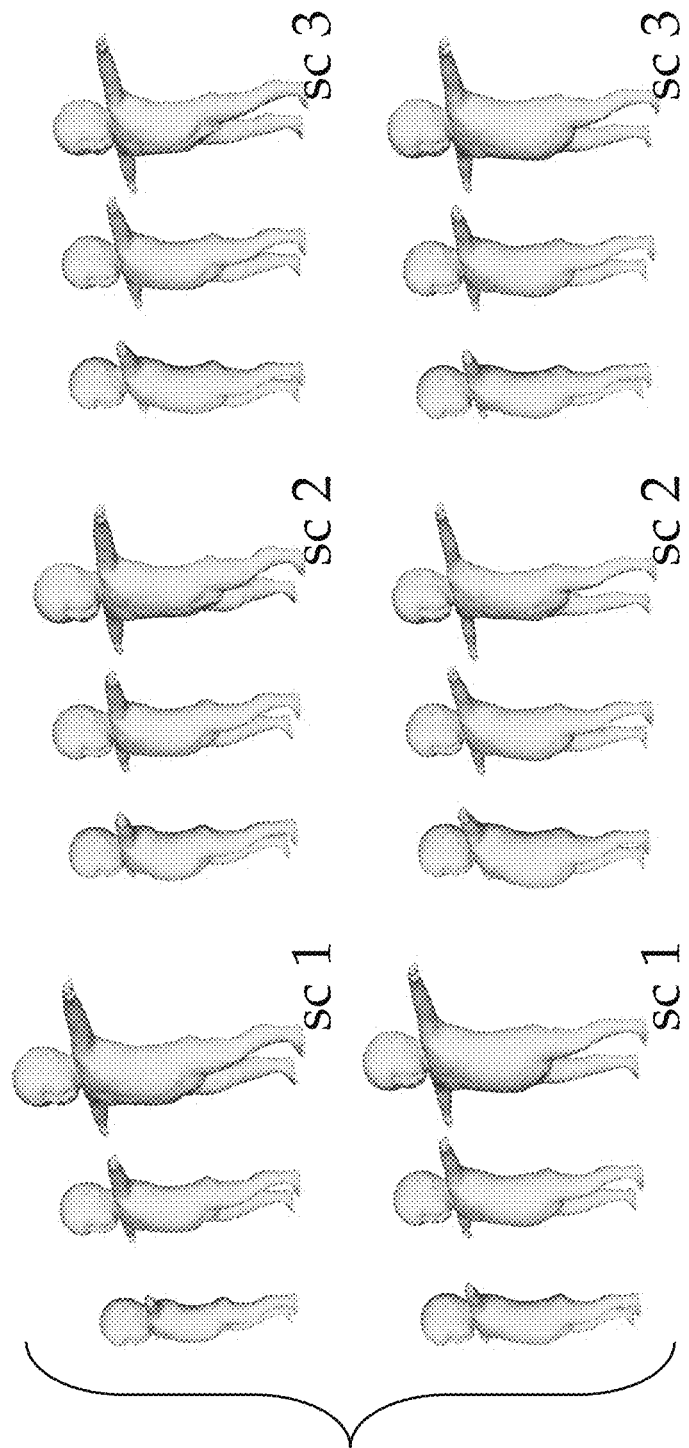
FIG. 22: shows the first 3 shape components (sc) for SMIL and for the SMPLB adult shape space. Top: SMIL, −2 to +2 standard deviations. Bottom: SMPLB, −0.5 to +0.5 standard deviations (i.e. the adult shape space). The first components in the infant shape (SMIL sc 2 and 3) carry variation in trunk size/length, while the first components of SMPLB show trunk variation mainly in the belly growing or shrinking.

FIG. 22 shows the first 3 shape components (sc) for SMIL and for the SMPLB adult shape space. Top: SMIL, −2 to +2 standard deviations. Bottom: SMPLB, −0.5 to +0.5 standard deviations (i.e. the adult shape space). The first components in the infant shape (SMIL sc 2 and 3) carry variation in trunk size/length, while the first components of SMPLB show trunk variation mainly in the belly growing or shrinking.

A pose data set is created by looping over all poses of all sequences and only adding poses to the set if the dissimilarity to any pose in the set is larger than a threshold. The new pose prior is learned from the final set containing 47K poses. The final set contains 47K poses and is used to learn the new pose prior. As the Gaussian pose prior cannot penalize illegal poses, e.g. unnatural bending of knees, penalties are manually added to avoid such poses.

The final SMIL model is composed of the shape space, the pose prior, and a base template, which is the mean of all personalized shapes.

The resulting SMIL model has been evaluated quantitatively with respect to SMPLB. The dataset consists of 37 recordings of infants from a tertiary care high-risk infants outpatient clinic, with an overall duration of over two hours. The infants' ages range from 9 to 18 weeks of corrected age (avg. of 14.6 weeks), their size range is 42 to 59 cm (avg. of 53.5 cm).

The infants were recorded using a Microsoft Kinect $V_1$, which is mounted 1 meter above an examination table, facing downwards. All parents gave written informed consent for their child to participate in this study, which was approved by the ethics committee of Ludwig Maximilian University Munich (LMU). The infants lie in supine position for three to five minutes without external stimulation, i.e. there is no interaction with caregivers or toys. The recorded infants are between 9 and 18 weeks of corrected age (post term), and their size range is 42 to 59 cm, with an average of 53.5 cm. They wear different types of clothing: none, diaper, onesie short arm/long arm, or tights. All sequences together sum up to roughly 200K frames, and have an overall duration of over two hours. SMIL is evaluated with a 9-fold cross validation, using 33 sequences for training the shape space and the pose prior, and 4 for testing. Different clothing styles were distributed across all training sets. The distance Es2m (cf. Eq. 21) of the scan to the model mesh was measured by computing the Euclidean distance of each scan point to the mesh surface. For evaluation, all scan points are considered to be labeled as skin, which reduces Eq. 21 to Eq. 22. The Geman-McClure function p is not used here, as one is interested in the actual Euclidean distances. To compare the SMPLB shape space to the SMIL shape space, both models were registered to each of the 37 fusion scans, using different numbers of shape components.

Figure 23:
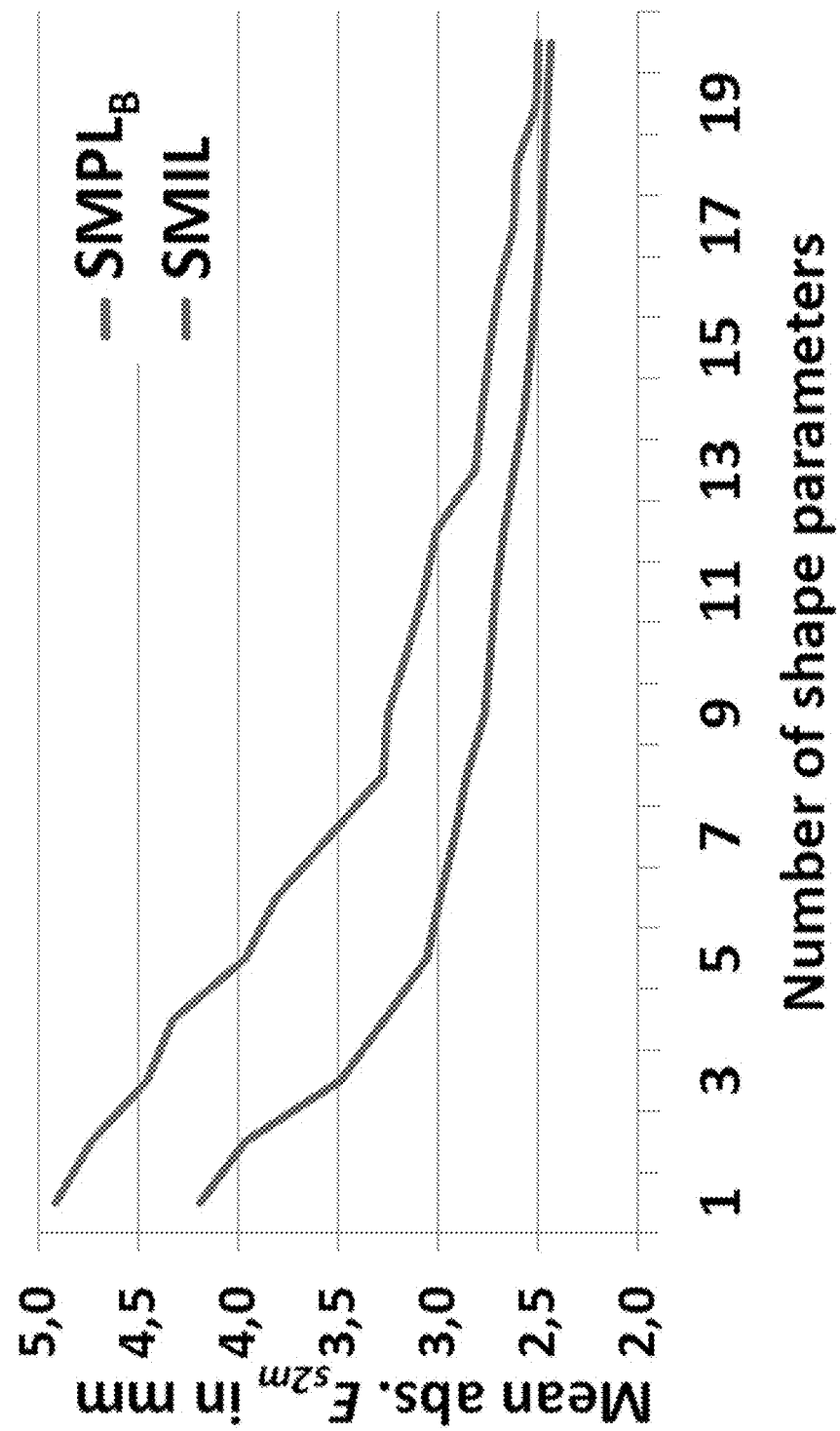
FIG. 23: shows average scan-to-mesh error Es2m in mm w.r.t. the number of shape parameters for the two models registered to all fusion scans.

FIG. 23 shows average scan-to-mesh error Es2m in mm w.r.t. the number of shape parameters for the two models registered to all fusion scans.

Figure 24:
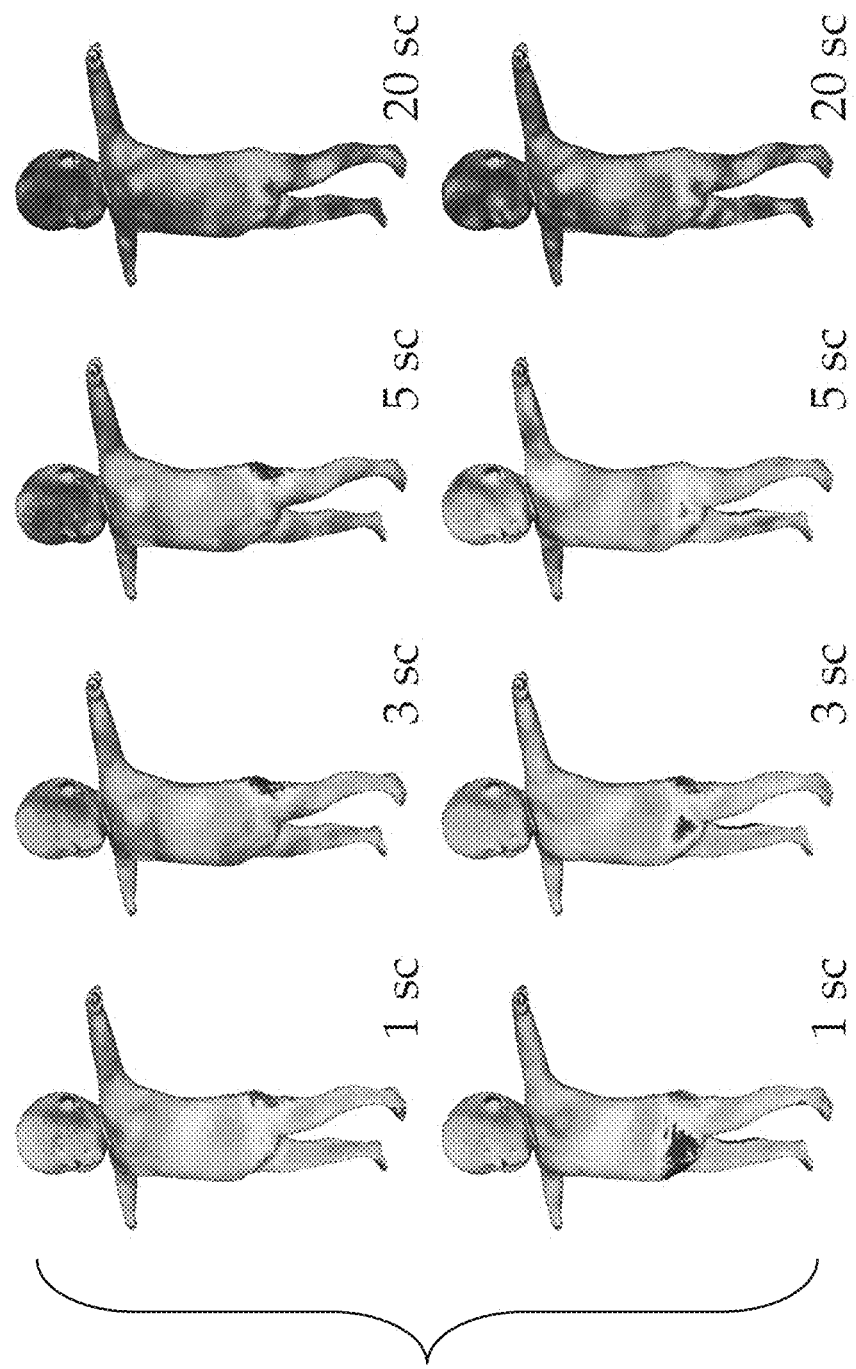
FIG. 24: shows average error heatmaps for SMIL and SMPLB on fusion clouds for different numbers of shape components (sc). Top: SMIL. Bottom: SMPLB. Blue means 0 mm, red means≥10 mm.

FIG. 24 shows average error heat maps for SMIL and SMPLB on fusion clouds for different numbers of shape components (sc). Top: SMIL. Bottom: SMPLB. Blue means 0 mm, red means≥10 mm. $SMPL_B$ is not the SMPL model, but the initial infant model, registered to the data using the inventive method.

Lower error is observed for SMIL for smaller numbers of shape parameters, and a nearly identical error when using all 20 parameters.

To evaluate how well the computed personalized shapes and poses explain the input sequences, Es2m was calculated for all 200K frames. SMIL achieves an average scan-to-mesh distance of 2.51 mm (SD 0.21 mm), SMPLB has an average Es2m of 2.67 mm (SD 0.22 mm).

Due to the lack of ground truth data for evaluation of infant pose correctness, a manual inspection of all sequences was performed to reveal pose errors, distinguishing between "unnatural poses" and "failure cases".

Figure 25:
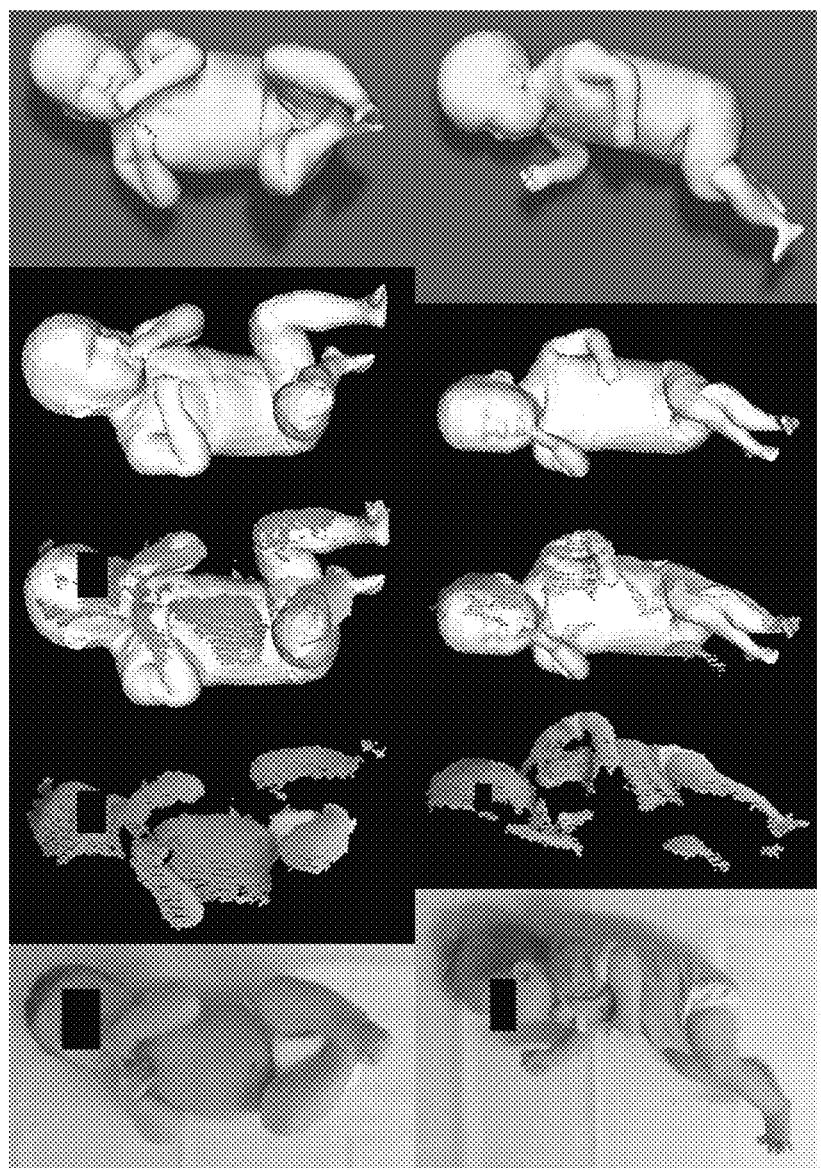
FIG. 25: shows unnatural pose (top) and failure case (bottom) samples. From left to right: RGB image, 3D point cloud (rotated for improved visibility), overlay of point cloud and registration result, registration result, rendered result from same viewpoint as RGB image.
Figure 26D:
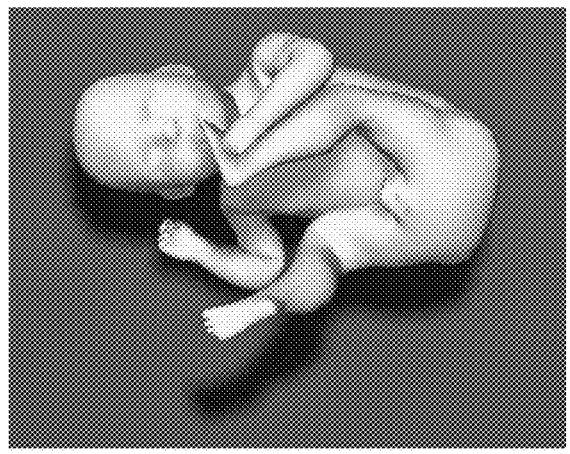
FIGS. 26A-26D: show an older infant in a very challenging pose. (a) RGB image, (b) 3D point cloud (rotated for improved visibility), (c) overlay of point cloud and SMIL registration result, (d) rendered SMIL registration result.
Figure 26C:
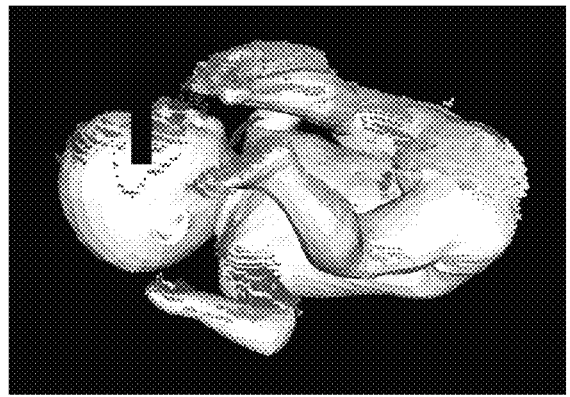
Figure 26B:
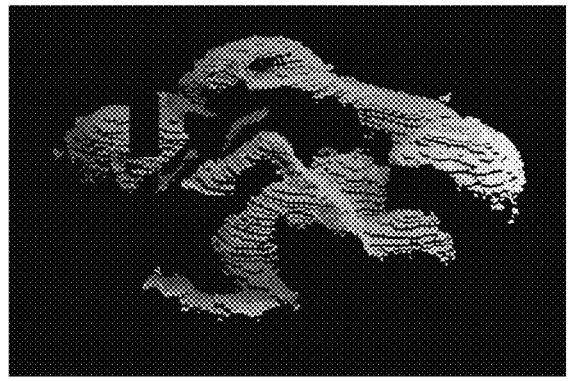
Figure 26A:

FIG. 25 shows unnatural pose (top) and failure case (bottom) samples. From left to right: RGB image, 3D point cloud (rotated for improved visibility), overlay of point cloud and registration result, registration result, rendered result from same viewpoint as RGB image. Unnatural poses contain errors in pose, like implausible rotations of a leg (cf. FIG. 25 top row), while the overall registration is plausible, i.e. the 3D joint positions are still at roughly the correct position.

Failure cases denote situations in which the optimization gets stuck in a local minimum with a clearly wrong pose, i.e. one model body part registered to a scan part which it does not belong to (cf. FIG. 25 bottom row). 16 unnatural leg/foot rotations were counted lasting 41 seconds (=0.54% of roughly 2 hours) and 18 failure cases (in 7 sequences) lasting 49 seconds (=0.66% of roughly 2 hours).

The most common failure is a mix-up of feet, i.e. left foot of the model registered to the right foot of the scan and vice versa. Despite the energy having the interpenetration penalty $E_{sc}$, a few cases are observed where the legs interpenetrate, as in the bottom row in FIG. 25. The registration of all sequences is time consuming (between 10 and 30 seconds per frame), so rerunning the full 200K registrations many times to optimize the parameters is not feasible. The energy term weights are manually selected in order to balance the different terms, and by visually inspecting the results of some sequences. Further manual adjustment of the Esc weight could fix these rare cases. In the example in the top row of FIG. 25, the right knee is twisted in an unnatural way after the right foot was completely occluded. When the foot is visible again, the pose recovers (knee twisted for 5-6 seconds). Similar to the first failure case, a higher weight on the pose prior would prevent such cases, but finding the perfect weight which completely forbids all illegal poses while allowing all legal poses would require a significant engineering effort or more training data.

To evaluate how well SMIL generalizes to older infants, the model was registered to 25 sequences of infants at the age between 21 and 36 weeks, at an average of 26 weeks. The resulting average scan to mesh distance is 2.83 mm (SD: 0.31 mm). With increasing age, infants learn to perform directed movements, like touching their hands, face, or feet. This makes motion capture even more challenging, as standard marker-based methods would not be recommended because of the risk of infants grabbing (and possibly swallowing) markers.

FIGS. 26A-26D show an older infant in a very challenging pose. (a) RGB image, (b) 3D point cloud (rotated for improved visibility), (c) overlay of point cloud and SMIL registration result, (d) rendered SMIL registration result.

Human movements contain key information for patient monitoring, quantifying therapy or disease progression, or performance assessment, e.g. by comparing the execution of a predefined movement with a reference motion. Most interestingly, the information can be applied to the early detection of neurodevelopmental disorders like cerebral palsy (CP) in infants at a very early age. The General Movements Assessment (GMA) approach enables trained experts to detect CP at an age of 2 to 4 months, based on assessing the movement quality of infants from video recordings. Infants with abnormal movement quality have very high risk of developing CP or minor neurological dysfunction [19]. While GMA is the most accurate clinical tool for early detection of CP, it is dependent on trained experts and is consequently subject to human perceptual variability. GMA experts require regular practice and recalibration to assure accurate ratings. Automation of this analysis could reduce this variability and dependence on human judgment. To allow GMA automation, a practical system must first demonstrate that it is capable of capturing the relevant information needed for GMA.

In order to show that SMIL captures enough motion information for medical assessment a case study on GMA was conducted. Two trained and certified GMA-experts perform GMA in different videos. Five stimuli were use: i) the original RGB videos (denoted by Vrgb), and ii) the synthetic registration videos (Vreg). For the next three stimuli the acquired poses of infants were used, but a body was animated with a different shape, namely iii) a randomly selected shape of another infant (Vother), iv) an extreme shape producing a very thick and large baby (Vlarge), and v) the mean shape (Vmean). Three of the 37 sequences were excluded, as two are too short and one has non-nutritive sucking, making it non suitable for GMA. As the number of videos to rate is high (34*5), for iv) and v) only 50% of the sequences were used, resulting in 136 videos. For a finer evaluation, GMA classes definitely abnormal (DA), mildly abnormal (MA), normal suboptimal (NS), and normal optimal (NO) were augmented into a one to ten scale. Scores 1-3 correspond to DA, 4-5 to MA, 6-7 to NS, and 8-10 to NO. two ratings with an absolute difference ≤1 were considered to agree, and otherwise to disagree.

Rater $R_1$ is a long-time GMA teacher and has worked on GMA for over 25 years, $R_2$ has 15 years experience in GMA. Average rating score (and standard deviation) for $R_1$ is 4.7 (1.4), for $R_2$ 4.0 (1.9). The agreement on original RGB ratings Vrgb between $R_1$ and $R_2$ is 65%. This further stresses that GMA is challenging and its automation important.

Figure 27:
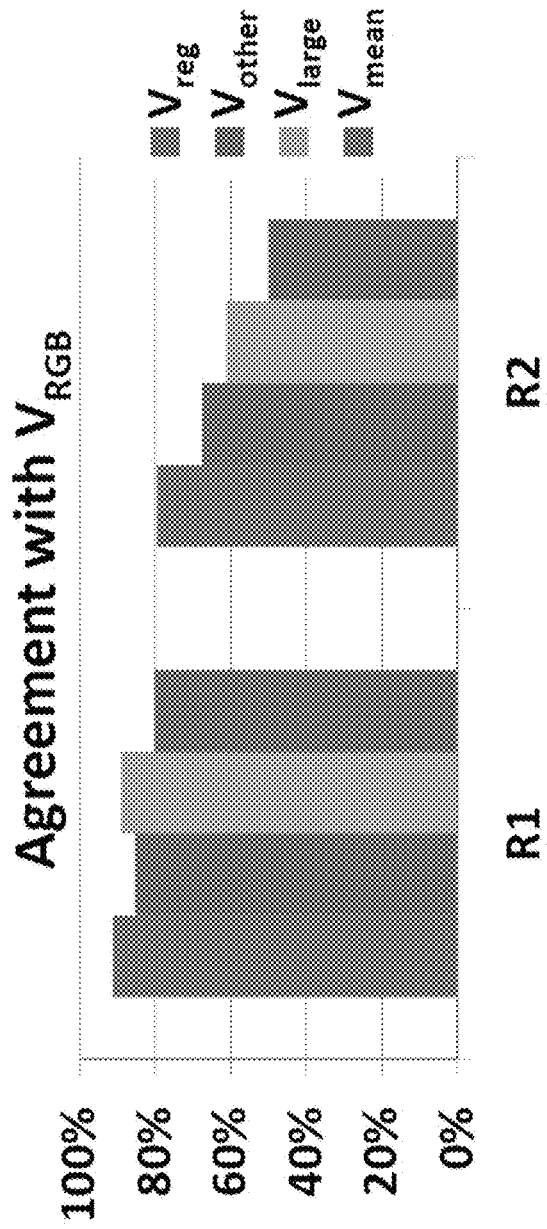
FIG. 27: shows results of the GMA case study. Percentage of ratings of synthetic sequences generated using SMIL, that agree with the reference ratings $R_1$Vrgb (left) and $R_2$Vrgb (right), respectively. Vfreg;other;large;meang denotes different stimuli.
Figure 29:
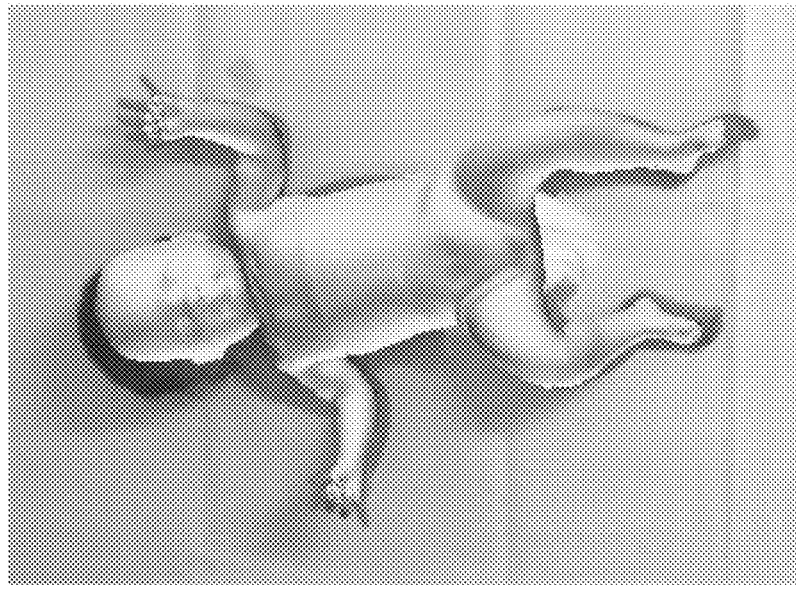
FIG. 29: shows a SMIL body model overlaid over an image of an infant.

FIG. 27 shows rating differences between synthetic and reference sequences. Each rater is compared to her own Vrgb ratings as a reference. $R_1$Vreg ratings agree on 91% of the reference ratings, whereas $R_2$ achieves an agreement rate of 79%. The agreement decreases more ($R_2$) or less ($R_1$) when the motions are presented with a different body shape.

According to a further aspect of the invention, the inventive SMIL model can be used to create a realistic (but yet privacy preserving) data set of moving infants in RGB-D. To create the data set, shape and pose of infants, and additionally a texture, was captured from RGB-D sequences. Random subsets of shapes and textures were selected and averaged to create new, synthetic, but realistic shapes and textures. The real captured poses were mapped to the new synthetic infants and ground truth 3D joint positions were extracted. OpenDR was used for rendering RGB and depth images to resemble commodity RGB-D sensors.

FIGS. 28A-28F show two data samples created using SMIL containing: RGB image (a,d); point cloud from depth image (b, e) and ground truth skeleton (c, f). Viewpoint for (b), (c), (e), and (f) is slightly rotated to the side.

Therefore, the inventive SMIL model can also be used to create realistic RGB-D data, which can in turn be used as an evaluation set for pose estimation in medical infant motion analysis scenarios. In particular, the data may be used to train neural networks for infant shape and pose estimation.

DISCUSSION

Importantly, the pose training data spans a range of body shapes enabling to learn a good predictor of joint locations. Second, training all the parameters (template shape, blend weights, joint regressor, shape/pose/dynamic blend shapes) to minimize vertex reconstruction error is important to obtain a good model. Here the simplicity of the model is an advantage as it enables training everything with large amounts of data.

In contrast to the scattered-data interpolation methods, the blend shapes are learned from a large set of training meshes covering the space of possible poses and learn a simpler function relating pose to blend-shape weights. In particular, the inventive function is linear in the elements of the part rotation matrices. The larger support of the learned linear functions as opposed to radial basis functions allows the model to generalize to arbitrary poses; in addition the simple linear form makes it fast to animate in a game engine without baking in the weights. Because elements of a rotation matrix are constrained, the model cannot "blow up"; when generalizing outside the training set.

SMPL is an additive model in vertex space. In contrast, while SCAPE also factors deformations into shape and pose deformations, SCAPE multiplies the triangle deformations. With SCAPE a bigger person will have bigger pose-dependent deformations even though these deformations are not learned for different body shapes. Despite this, the experiments show that, the SCAPE approach is less accurate at generalizing to new shapes. Ideally one would have enough pose data from enough different people to learn a true body-shape dependent pose deformation space. DMPL, where deformations depend on body shape, shows that this is possible.

Models based on the statistics of triangle deformations have dominated the recent literature [Anguelov et al. 2005; Chen et al. 2013; Freifeld and Black 2012; Hasler et al. 2009]. Such models are not trained to reproduce their training registrations directly. Instead, they are trained to reproduce the local deformations that produced those registrations. Part of the tractability of training these models comes from the ability to train deformations independently across triangles. As a result, long range distances and relationships are not preserved as well as local relationships between vertices. An advantage of vertex based models (such as SMPL and [Allen et al. 2006]) is that they can be trained to minimize the mean squared error between the model and training vertices. One could train a SCAPE model to minimize vertex error in global coordinates, but the inner loop of the optimization would involve solving a least-squares problem to reconstruct vertices from the deformations. This would significantly increase the cost of optimization and make it difficult to train the model with large amounts of data.

The key to SMPL's performance is to make the blend shapes a linear function of the elements of $R^*(\vec{\theta})$. This formulation, sufficient training data, and a good optimization strategy make it possible to learn the model.

Figure 16:
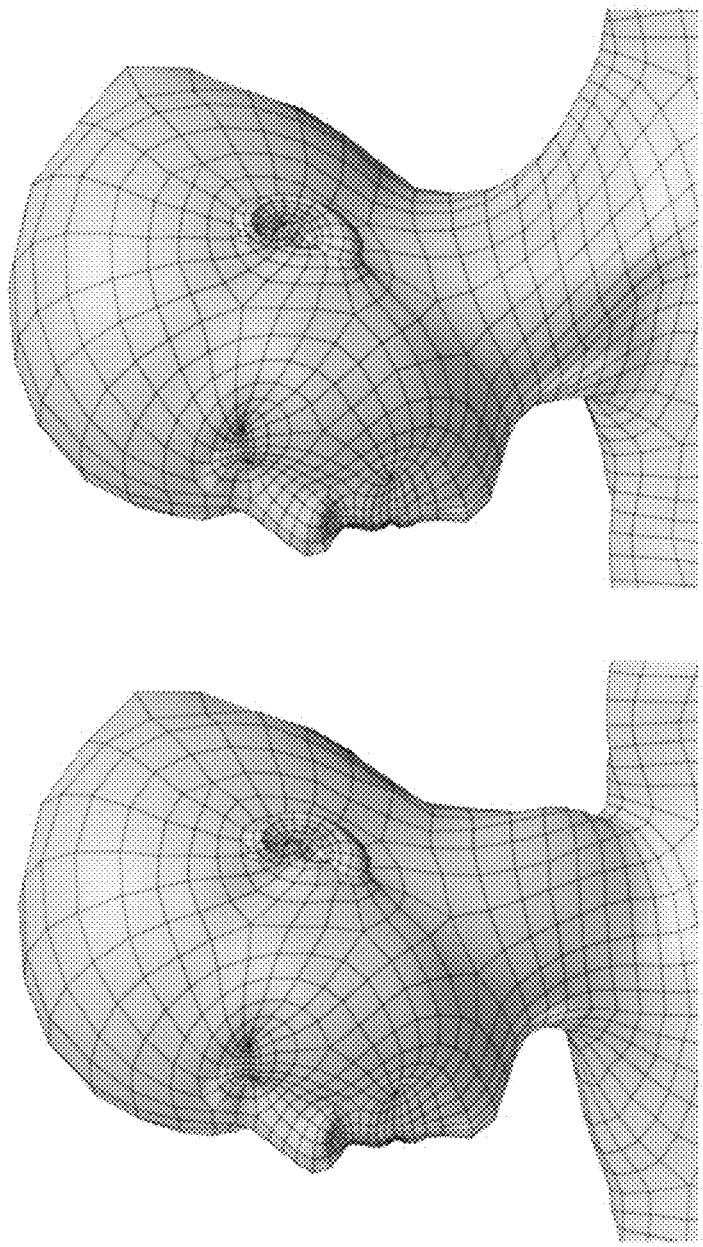
FIGS. 16A-16B: shows parameterizing pose blend shapes. (a) Pose blend shapes parameterized by Euler angles cause significant problems. (b) the proposed parameterization allows the head to rotate in either direction with natural deformations.

In a further embodiment of the invention, pose blend shapes may be driven linearly from other features, such as raw $\vec{\theta}$, simple polynomials of $\vec{\theta}$, and trigonometric functions (sin, cos) of $\vec{\theta}$. Using raw $\vec{\theta}$ has limitations because the values vary between $-\pi$ and $\pi$. Imagine a twist of the neck (FIG. 16), which produces negative and positive angles about the vertical axis. Standard LBS will cause the neck to shrink as it rotates in either direction. To counteract this, a blend shape is required that increases the neck volume no matter which direction it rotates.

In general the raw rotations may be replaced with any functions of rotations and used to weight the blend shapes; for example, normalized quaternions.

The pose-dependent offsets of the basic SMPL model are not dependent on body shape. It is surprising how well SMPL works without this, but the general approach would likely not work if a space of nonrealistic animated characters were modeled, in which body part scales vary widely, or a space of humans that includes infants and adults. However, this limitation may be addressed by training a more general function that takes elements of $R^*(\vec{\theta})$ together with $\vec{\beta}$ to predict the blend shape coefficients. The dynamic blend shape coefficients of DMPL already depend on body shape and therefore the same approach can be used to make the pose blend shapes depend on body shape. This does not significantly complicate the model or run-time behavior, but may only require more training data.

As described, the basic SMPL model is a function of joint angles and shape parameters only: it does not model breathing, facial motion, muscle tension, or any changes independent of skeletal joint angles and overall shape. These can be learned as additional additive blend shapes (as with DMPL) if the appropriate factored data is available (cf. [Tsoli et al. 2014]).

While the segmentation of the template into parts, the topology of the mesh, and the zero pose are normally defined in the previous embodiments, these can also be learned.

SMPL uses 207 pose blend shapes. In some cases, this may be reduced by performing PCA on the blend shapes, reducing the number of multiplications and consequently increasing rendering speed. Also, the dynamic model uses PCA to learn the dynamic blend shapes but one may also learn the elements of these blend shapes directly as done for the pose blend shapes. Finally, instead of fitting the model to registered meshes one may also fit it to mocap marker data (cf. MoSh [Loper et al. 2014]), depth data, or video data.

REFERENCES

ALLEN, B., CURLESS, B, AND POPOVIĆ, Z. 2002. Articulated body deformation from range scan data. ACM Trans. Graph. (Proc. SIGGRAPH) 21, 3 (July), 612-619.

ALLEN, B., CURLESS, B., AND POPOVIĆ, Z. 2003. The space of human body shapes: Reconstruction and parameterization from range scans. ACM Trans. Graph. (Proc. SIGGRAPH) 22, 3, 587-594.

ALLEN, B., CURLESS, B., POPOVIĆ, Z., AND HERTZMANN, A. 2006. Learning a correlated model of identity and posedependent body shape variation for real-time synthesis. In Proceedings of the 2006 ACM SIGGRAPH/Eurographics Symposium on Computer Animation, Eurographics Association, Airela-Ville, Switzerland, Switzerland, SCA '06, 147-156.

ANGUELOV, D., SRINIVASAN, P., KOLLER, D., THRUN, S., RODGERS, J., AND DAVIS, J. 2005. SCAPE: Shape Completion and Animation of PEople. ACM Trans. Graph. (Proc. SIGGRAPH24, 3, 408-416.

BARAN, I., AND POPOVIĆ, J. 2007. Automatic rigging and animation of 3D characters. ACM Trans. Graph. (Proc. SIGGRAPH) 26, 3 (July).

BOGO, F., ROMERO, J., LOPER, M., AND BLACK, M. J. 2014. FAUST: Dataset and evaluation for 3D mesh registration. In Proc. IEEE Conf. on Computer Vision and Pattern Recognition (CVPR), 3794-3801.

CHANG, W., AND ZWICKER, M. 2009. Range scan registration using reduced deformable models. Computer Graphics Forum 28, 2, 447-456.

CHEN, Y., LIU, Z., AND ZHANG, Z. 2013. Tensor-based human body modeling. In IEEE Conf. on Computer Vision and Pattern Recognition (CVPR), 105-112. 2000. CMU graphics lab motion capture database. http://mocap.cs.cmu.edu. Accessed: 2012-12-11.

CORAZZA, S., AND GAMBARETTO, E., 2014. Automatic generation of 3D character animation from 3D meshes, August 5. U.S. Pat. No. 8,797,328.

DE AGUIAR, E., THEOBALT, C., THRUN, S., AND SEIDEL, H.-P. 2008. Automatic conversion of mesh animations into skeleton based animations. Computer Graphics Forum 27, 2, 389-397. 2015. Dyna dataset. http://dyna.is.tue.mpg.de/. Accessed: 2015 May 15.

FREIFELD, O., AND BLACK, M. J. 2012. Lie bodies: A manifold representation of 3D human shape. In European Conf. on Computer Vision (ECCV), Springer-Verlag, A. Fitzgibbon et al. (Eds.), Ed., Part I, LNCS 7572, 1-14.

HASLER, N., STOLL, C., SUNKEL, M., ROSENHAHN, B., AND SEIDEL, H. 2009. A statistical model of human pose and body shape. Computer Graphics Forum 28, 2, 337-34 6.

HASLER, N., THORMÄHLEN, T., ROSENHAHN, B., AND SEIDEL, H.-P. 2010. Learning skeletons for shape and pose. In Proceedings of the 2010 ACM SIGGRAPH Symposium on Interactive 3D Graphics and Games, ACM, New York, N.Y., USA, I3D '10, 23-30.

HIRSHBERG, D., LOPER, M., RACHLIN, E., AND BLACK, M. 2012. Coregistration: Simultaneous alignment and modeling of articulated 3D shape. In European Conf. on Computer Vision (ECCV), Springer-Verlag, A. F. et al. (Eds.), Ed., LNCS 7577, Part IV, 242-255.

JAMES, D. L., AND TWIGG, C. D. 2005. Skinning mesh animations. ACM Trans. Graph. 24, 3 (July), 399-407.

KAVAN, L., AND ÁRA, J. 2005. Spherical blend skinning: Areal-time deformation of articulated models. In Proceedings of the 2005 Symposium on Interactive 3D Graphics and Games, ACM, New York, N.Y., USA, I3D '05, 9-16.

KAVAN, L., COLLINS, S., ÁRA, J., AND O'SULLIVAN, C. 2008. Geometric skinning with approximate dual quaternion blending. ACM Transactions on Graphics (TOG) 27, 4, 105:1-105:23.

KAVAN, L., COLLINS, S., AND O'SULLIVAN, C. 2009. Automatic linearization of nonlinear skinning. In Proceedings of the 2009 Symposium on Interactive 3D Graphics and Games, ACM, New York, N.Y., USA, I3D '09, 49-56.

KRY, P. G., JAMES, D. L., AND PAI, D. K. 2002. EigenSkin: Real time large deformation character skinning in hardware. In Proceedings of the 2002 ACM SIGGRAPH/Eurographics Symposium on Computer Animation, ACM, New York, N.Y., USA, SCA '02, 153-159.

KURIHARA, T., AND MIYATA, N. 2004. Modeling deformable human hands from medical images. In Proceedings of the 2004 ACM SIGGRAPH/Eurographics Symposium on Computer Animation, Eurographics Association, Aire-la-Ville, Switzerland, Switzerland, SCA '04, 355-363.

LAWSON, C. L., AND HANSON, R. J. 1995. Solving least squares problems. Classics in applied mathematics. SIAM, Philadelphia, Pa. SIAM: Society of industrial and applied mathematics.

LE, B. H., AND DENG, Z. 2012. Smooth skinning decomposition with rigid bones. ACM Trans. Graph. 31, 6 (November), 199:1-199:10.

LE, B. H., AND DENG, Z. 2014. Robust and accurate skeletal rigging from mesh sequences. ACM Trans. Graph. 33, 4 (July), 84:1-84:10.

LEWIS, J. P., CORDNER, M., AND FONG, N. 2000. Pose space deformation: A unified approach to shape interpolation and skeleton-driven deformation. In Proceedings of the 27th Annual Conference on Computer Graphics and Interactive Techniques, ACM Press/Addison-Wesley Publishing Co., New York, N.Y., USA, SIGGRAPH '00, 165-172.

LOPER, M. M., AND BLACK, M. J. 2014. OpenDR: An approximate differentiable renderer. In Computer Vision—ECCV 2014, Springer, Heidelberg, D. Fleet, T. Pajdla, B. Schiele, and T. Tuytelaars, Eds., vol. 8695 of Lecture Notes in Computer Science, 154-169.

LOPER, M. M., MAHMOOD, N., AND BLACK, M. J. 2014. MoSh: Motion and shape capture from sparse markers. ACM Trans. Graph., (Proc. SIGGRAPH Asia) 33, 6 (November), 220:1-220:13.

MERRY, B., MARAIS, P., AND GAIN, J. 2006. Animation space: A truly linear framework for character animation. ACM Trans. Graph. 25, 4 (October), 1400-1423.

MILLER, C., ARIKAN, O., AND FUSSELL, D. 2010. Frankenrigs: Building character rigs from multiple sources. In Proceedings of the 2010 ACM SIGGRAPH Symposium on Interactive 3D Graphics and Games, ACM, New York, N.Y., USA, I3D '10, 31-38.

MOHR, A., AND GLEICHER, M. 2003. Building efficient, accurate character skins from examples. ACM Trans. Graph. (Proc. SIGGRAPH), 562-568.

NOCEDAL, J., AND WRIGHT, S. J. 2006. Numerical Optimization, 2nd ed. Springer, New York.

PONS-MOLL, G., ROMERO, J., MAHMOOD, N., AND BLACK, M. J. 2015. Dyna: A model of dynamic human shape in motion. ACM Transactions on Graphics, (Proc. SIGGRAPH) 34, 4 (July), 120:1-120:14.

RHEE, T., LEWIS, J., AND NEUMANN, U. 2006. Real-time weighted pose-space deformation on the GPU. EUROGRAPHICS 25, 3.

ROBINETTE, K., BLACKWELL, S., DAANEN, H., BOEHMER, M., FLEMING, S., BRILL, T., HOEFER-LIN, D., AND BURNSIDES, D. 2002. Civilian American and European Surface Anthropometry Resource (CAESAR) final report. Tech. Rep. AFRL-HEWP-TR-2002-0169, US Air Force Research Laboratory.

ROUET, C., AND LEWIS, J., 1999. Method and apparatus for creating lifelike digital representations of computer animated objects by providing corrective enveloping, March 16. U.S. Pat. No. 5,883,638.

SCHAEFER, S., AND YUKSEL, C. 2007. Example-based skeleton extraction. In Proceedings of the Fifth Eurographics Symposium on Geometry Processing, Eurographics Association, Airela-Ville, Switzerland, Switzerland, SGP '07, 153-162.

SEO, H., CORDIER, F., AND MAGNENAT-THALMANN, N. 2003. Synthesizing animatable body models with parameterized shape modifications. In Proceedings of the 2003 ACM SIGGRAPH/Eurographics Symposium on Computer Animation, Eurographics Association, Aire-la-Ville, Switzerland, Switzerland, SCA '03, 120-125.

TSOLI, A., MAHMOOD, N., AND BLACK, M. J. 2014. Breathing life into shape: Capturing, modeling and animating 3D human 52:1-52:11.

WANG, X. C., AND PHILLIPS, C. 2002. Multi-weight enveloping: Least-squares approximation techniques for skin animation. In Proceedings of the 2002 ACM SIGGRAPH/Eurographics Symposium on Computer Animation, ACM, New York, N.Y., USA, SCA '02, 129-138.

WANG, R. Y., PULLI, K., AND POPOVIĆ, J. 2007. Real-time enveloping with rotational regression. ACM Trans. Graph. (Proc. SIGGRAPH) 26, 3 (July).

WEBER, O., SORKINE, O., LIPMAN, Y., AND GOTSMAN, C. 2007. Context-aware skeletal shape deformation. Computer Graphics Forum 26, 3 (September), 265-274.

We claim:

1. A computer-implemented method for automatically obtaining pose and shape parameters of a human body, the method comprising:
    obtaining a sequence of digital 3D images of the body, recorded by at least one depth camera;
    automatically obtaining pose and shape parameters of the body, based on images of the sequence and a statistical body model; and
    outputting the pose and shape parameters,
    wherein the step of automatically obtaining comprises:
    automatically registering the statistical body model to images of the sequence, in order to obtain the pose and shape parameters.

2. The method of claim 1, wherein the step of automatically registering comprises
    automatically selecting an initialization frame from the sequence of digital 3D images.

3. The method of claim 2, wherein the automatic selection is based on a 2D length of at least one body segment in each frame.

4. The method of claim 3, wherein the 2D length of the body segment in each frame is weighted with a confidence value indicating a confidence of joints belonging to the body segment in that frame.

5. The method of claim 2, wherein neighboring frames are processed forward and/or backward in time, using the shape and pose parameters of the previous frame as initialization.

6. The method of claim 5, wherein the processing starts from the automatically selected initialization frame.

7. The method of claim 1, wherein the pose and shape parameters of the body are obtained by reducing an energy function.

8. The method of claim 7, wherein the energy function takes a scan to registration mesh distance into account.

9. The method of claim 8, wherein the energy function further takes distance between estimated and registration landmarks projected to 2D into account.

10. The method of claim 9, wherein the energy function further enforces temporal pose smoothness.

11. The method of claim 10, wherein the energy function penalizes model self intersections.

12. The method of claim 1, further comprising the step of filtering the digital 3D images in order to remove background information.

13. The method of claim 1, wherein the digital 3D images are represented as 3D point clouds.

14. The method of claim 1, wherein the statistical body model comprises a shape space, a pose prior and a base template representing a mean (an average) shape.

15. The method of claim 1, wherein the human body can move freely during image acquisition.

16. A non-intrusive method for capturing motions of freely moving humans or animals, the method comprising:
    acquiring depth images for a defined amount of time, using a depth camera; and
    obtaining pose and shape parameters of the body using a method according to claim 1.

17. Use of a method according to claim 1 for automatically obtaining a general movement assessment (GAM) of an infant.

18. A computer-implemented method for learning a statistical 3D skinned multi-infant linear body model (SMIL), the method comprising:
- using a depth camera, acquiring sequences of depth images from a multitude of infants;
- for each infant, obtaining personalized shape parameters, based on the corresponding sequence of depth images; and
- determining an infant shape space, based on the personalized shape parameters.

19. The method of claim 18, wherein the infant shape space is obtained by weighted principal component analysis (WPCA) of the personalized shape parameters of the sequences.

20. The method of claim 18, further comprising:
- obtaining a pose prior of the multi-infant linear body model.

21. The method of claim 20, wherein the pose prior is learned, based on the sequences of depth images.

22. The method of claim 20, further comprising:
- obtaining a base template as a mean of all personalized shapes.

23. A statistical 3D skinned multi-infant linear body model (SMIL), learned according to the method of claim 18.

24. The method of claim 1, wherein the body is an infant body.

* * * * *